US009044098B2

(12) United States Patent
Bauer

(10) Patent No.: US 9,044,098 B2
(45) Date of Patent: Jun. 2, 2015

(54) ADJUSTABLE ARMREST ASSEMBLY

(71) Applicant: Holland Plastics Corporation, Grand Haven, MI (US)

(72) Inventor: Nathaniel David Bauer, Grand Haven, MI (US)

(73) Assignee: Holland Plastics Corporation, Grand Haven, MI (US)

(*) Notice: Subject to any disclaimer, the term of this patent is extended or adjusted under 35 U.S.C. 154(b) by 0 days.

(21) Appl. No.: 14/063,020

(22) Filed: Oct. 25, 2013

(65) Prior Publication Data

US 2014/0139001 A1 May 22, 2014

Related U.S. Application Data

(60) Provisional application No. 61/727,247, filed on Nov. 16, 2012.

(51) Int. Cl.
*A47C 7/54* (2006.01)
*B60N 2/46* (2006.01)
*A47C 1/03* (2006.01)

(52) U.S. Cl.
CPC . *A47C 7/54* (2013.01); *A47C 7/543* (2013.01); *B60N 2/464* (2013.01); *B60N 2/4626* (2013.01); *A47C 1/03* (2013.01)

(58) Field of Classification Search
CPC .......... A47C 1/03; A47C 7/546; A47C 7/543; A47C 7/54; A47B 21/037; B60N 2/464; B60N 2/4626; A61G 2005/125; B62J 1/28
USPC ................ 297/411.35, 411.2, 411.36, 411.31
See application file for complete search history.

(56) References Cited

U.S. PATENT DOCUMENTS

| | | |
|---|---|---|
| 3,934,927 A | 1/1976 | Zur |
| 4,085,967 A | 4/1978 | Spencer |
| 4,097,088 A | 6/1978 | Meiller |
| 4,176,878 A | 12/1979 | Koutsky |
| 4,674,798 A | 6/1987 | Oeth et al. |
| 5,383,704 A | 1/1995 | Granados et al. |
| 5,415,459 A | 5/1995 | Schultz |
| 5,439,267 A | 8/1995 | Peterson et al. |
| 5,439,268 A | 8/1995 | Dozsa-Farkas |
| 5,599,067 A | 2/1997 | Schuelke et al. |
| 5,612,718 A | 3/1997 | Bryan |
| 5,667,277 A | 9/1997 | Van De Riet |
| 5,676,483 A | 10/1997 | Koubek |
| 5,733,010 A | 3/1998 | Lewis et al. |
| 5,749,628 A | 5/1998 | Synder et al. |
| 5,848,823 A | 12/1998 | Su |
| 5,884,975 A | 3/1999 | Su |
| 5,924,769 A | 7/1999 | Kao |
| 5,931,537 A | 8/1999 | Gollin et al. |
| 5,971,484 A | 10/1999 | Lamart et al. |
| 5,984,416 A | 11/1999 | Waldo et al. |
| 6,017,091 A | 1/2000 | Cao |

(Continued)

*Primary Examiner* — Chi Q Nguyen
(74) *Attorney, Agent, or Firm* — Hultman Law, PLC; Eric Andrew Hultman, Esq.

(57) ABSTRACT

An adjustable armrest for a chair is disclosed herein and comprises an assembly of a mounting plate, a mounting base, and two arms. The adjustable armrest's mounting plate is vertically positionable, such that when the mounting plate is depressed, the motion of the mounting plate is restrained relative to the mounting base. Additionally, when the mounting plate is raised vertically, the arms and the mounting plate can be repositioned.

20 Claims, 29 Drawing Sheets

(56) References Cited

U.S. PATENT DOCUMENTS

| | | | |
|---|---|---|---|
| 6,053,578 A | 4/2000 | van Hekken et al. |
| 6,076,892 A | 6/2000 | van Hekken et al. |
| 6,132,001 A | 10/2000 | Su |
| 6,139,107 A | 10/2000 | Lee |
| 6,168,237 B1 | 1/2001 | Lamart et al. |
| 6,176,550 B1 | 1/2001 | Lamart et al. |
| 6,209,960 B1 | 4/2001 | Bradbury |
| 6,213,556 B1 | 4/2001 | Chen |
| 6,290,300 B1 | 9/2001 | Sutton et al. |
| 6,296,312 B1 | 10/2001 | Congleton et al. |
| 6,302,486 B1 | 10/2001 | Lamart et al. |
| 6,343,839 B1 | 2/2002 | Simons, Jr. et al. |
| 6,394,553 B1 | 5/2002 | McAllister et al. |
| 6,398,309 B1 | 6/2002 | Chen |
| 6,425,636 B2 | 7/2002 | Chen |
| 6,460,932 B1 | 10/2002 | Kopish et al. |
| 6,467,847 B2 | 10/2002 | Bidare |
| 6,502,904 B1 | 1/2003 | Hansen |
| 6,540,300 B2 | 4/2003 | Piretti |
| 6,578,922 B2 | 6/2003 | Khedira et al. |
| 6,588,847 B2 | 7/2003 | Murakami |
| 6,619,746 B2 | 9/2003 | Roslund, Jr. et al. |
| 6,663,182 B1 | 12/2003 | Dolci et al. |
| 6,663,183 B1 | 12/2003 | Liao |
| 6,719,367 B2 | 4/2004 | Mic et al. |
| 6,799,803 B1 | 10/2004 | Lee et al. |
| 6,802,566 B2 | 10/2004 | Prince et al. |
| 6,893,386 B2 | 5/2005 | Charoenchit |
| 6,908,158 B2 | 6/2005 | Willette et al. |
| 6,948,774 B2 | 9/2005 | Maier et al. |
| 6,948,775 B2 | 9/2005 | Tsai |
| 6,974,189 B2 | 12/2005 | Machael et al. |
| 6,974,190 B1 | 12/2005 | Hung |
| 7,066,546 B2 | 6/2006 | Trego et al. |
| 7,114,781 B2 | 10/2006 | Costaglia |
| 7,150,504 B1 | 12/2006 | Lee |
| 7,156,466 B1 | 1/2007 | Chang |
| 7,159,947 B1 | 1/2007 | Lee |
| 7,188,907 B1 | 3/2007 | Lai |
| 7,201,449 B2 | 4/2007 | Tsai |
| 7,201,450 B2 | 4/2007 | Chen |
| 7,341,313 B2 | 3/2008 | Bedford et al. |
| 7,360,839 B1 | 4/2008 | Chen |
| 7,387,341 B1 | 6/2008 | Tsai |
| 7,434,887 B1 | 10/2008 | Hsien |
| 7,559,609 B2 | 7/2009 | Tsai |
| 7,581,791 B2 | 9/2009 | Diffrient |
| 7,641,284 B2 | 1/2010 | Jones et al. |
| 7,815,259 B2 | 10/2010 | Fookes et al. |
| 7,837,269 B2 | 11/2010 | Bock |
| 7,857,393 B2 | 12/2010 | Cebula et al. |
| 7,862,123 B2 | 1/2011 | Baker et al. |
| 7,980,631 B2 | 7/2011 | Diffrient |
| 8,002,357 B2 | 8/2011 | Cebula et al. |
| 8,016,360 B2 | 9/2011 | Machael et al. |
| 8,061,778 B2 | 11/2011 | Machael et al. |
| 8,104,837 B2 | 1/2012 | Diffrient |
| 8,226,171 B2 | 7/2012 | Fang |
| 8,235,468 B2 | 8/2012 | Fookes et al. |
| 8,246,117 B2 | 8/2012 | Melhuish et al. |
| 8,622,477 B2 * | 1/2014 | Colasanti et al. ........ 297/411.35 |
| 2009/0302661 A1 | 12/2009 | Melhuish et al. |

\* cited by examiner

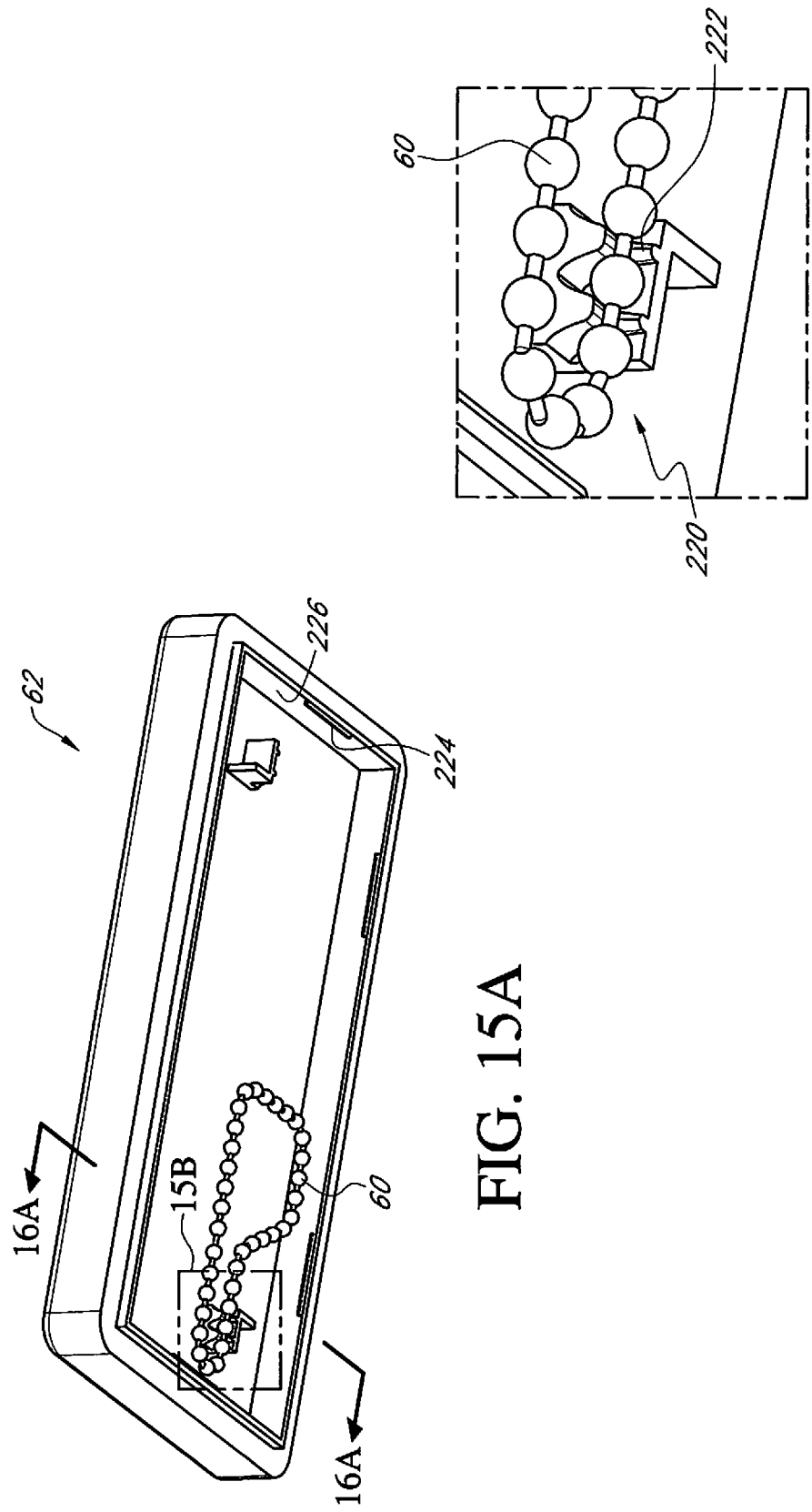

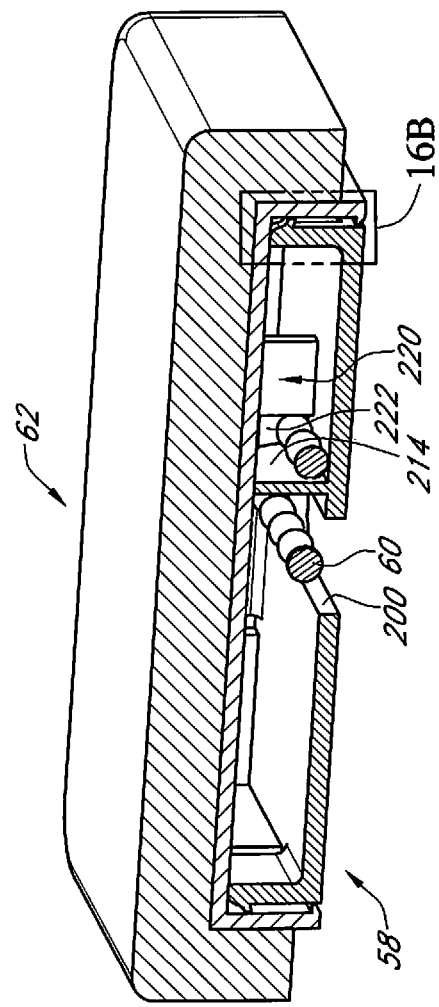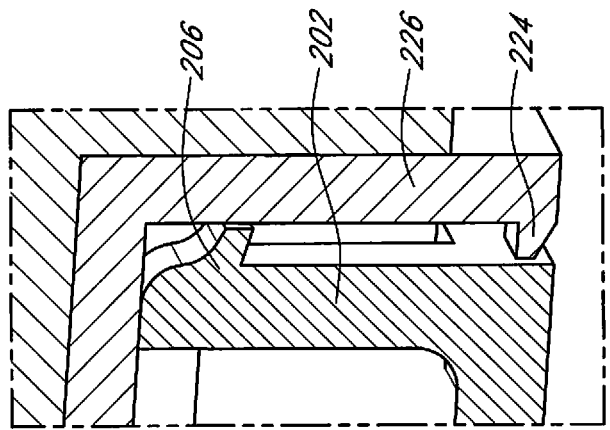
FIG. 16A
FIG. 16B

ADJUSTABLE ARMREST ASSEMBLY

CROSS REFERENCE TO RELATED APPLICATION

This application is a non-provisional application claiming priority to an earlier filed U.S. provisional patent application entitled, "ADJUSTABLE ARM REST ASSEMBLY," filed Nov. 16, 2012, and assigned Ser. No. 61/727,247, the contents of which are incorporated herein by reference.

BACKGROUND OF THE INVENTION

1. Field of the Invention

The present invention relates generally to the field of adjustable support surfaces which include armrests for office chairs.

2. Description of the Related Art

Office chairs are a common fixture in today's office environment, providing ergonomically positioned support surfaces which allow their users to remain seated for extended periods of time. It is desirable that office chairs include adjustable features, such as adjustable seating height and adjustable lumbar support which may be positioned to suit their individual user. However, today's office chairs have armrests which lack the desired level of adjustability. Prior art armrests offer limited forms of adjustment through the use of complex mechanisms often requiring separate releases for each individual motion.

The invention described herein solves these disadvantages by providing a positionable armrest assembly with a novel retention system. This retention system is controlled by the vertical position of the armrest's support surface, allowing the retention system to become engaged or disengaged with a single vertical motion without the need for a push button. This invention represents a further improvement over the prior art by reducing the number of moving parts, reducing the number of potential failure modes, and lowering manufacturing costs.

SUMMARY OF THE INVENTION

In one embodiment of the invention, the adjustable arm rest for a chair comprises a mounting plate including a base portion having a slot, a first arm including a first slot engaging feature, a second arm including a second slot engaging feature, and a mounting base. The first arm's first slot engaging feature and the second arm's second slot engaging feature are assembled to and slide within the slot in said mounting plate. The first arm and the second arm are then pivotally mounted to the mounting base. This configuration allows the mounting plate to be vertically positioned into an engaged or a non-engaged configuration. When in the engaged configuration the rotation of the first and second arms is restrained. When in the non-engaged configuration, the first and second arms are allowed to rotate.

In another embodiment of the invention, the adjustable arm rest for a chair comprises: a mounting plate including a base portion having a slot; a first arm including a first slot engaging feature, a base portion, a socket placed through the base portion, and a first anti-rotation feature on said base portion; a second arm including a second slot engaging feature, a main shaft, and a second anti-rotation feature on the main shaft; and a mounting base having a first hole and a counterbore. The mounting base further includes a third anti-rotation feature on a portion of the side wall inside the hole, and a fourth anti-rotation feature on the side wall of the counterbore. The first arm and the second arm are pivotally mounted to the mounting base by inserting the second arm's main shaft into the first arm's socket and placing the main shaft into the first hole in the mounting base causing the axis of rotation of the first arm to lie substantially concentric with the axis of rotation of the second arm. The first arm's first slot engaging feature and second arm's second slot engaging feature are then inserted into and slide within the slot in the mounting plate. This assembly allows the mounting plate to be vertically positioned relative to the mounting base creating an engaged and a non-engaged configuration.

When the mounting plate is placed into the engaged configuration by pressing the mounting plate downward toward the mounting base, the first and the third anti-rotation features engage each other, thus restraining the first arm from rotating within the base. The second and the fourth anti-rotation features also engage each other restraining the second arm from rotating within the base. This prevents the mounting plate from moving relative to the mounting base in at least two degrees of freedom.

When the mounting cover is placed into the non-engaged configuration by lifting the mounting plate upward vertically, away from the mounting base, the first and the second anti-rotation features disengage from one another allowing the first arm to rotate within the mounting base. The third and the fourth anti-rotation features also disengage from one another allowing the second arm to rotate within the mounting base. This allows the mounting plate to move relative to the mounting base in at least two degrees of freedom.

In still another embodiment of the invention, the adjustable arm rest for a chair comprises: a first arm including a first slot engaging feature, a base portion, a socket placed through the base portion, and a first anti-rotation feature on the base portion; a second arm including a second slot engaging feature, a main shaft, and a second anti-rotation feature on a portion of the main shaft; a mounting base having a first hole and a counterbore, wherein a third anti-rotation feature lies on portion of the side wall inside of the hole, and a fourth anti-rotation feature lies on the on the side wall of the counterbore; a mounting plate having a base portion, a slot; a fore-aft restraint system having a ball chain raceway, a ball chain, a chain tensioner; and a cover including a ball chain engagement feature.

In this embodiment, the first arm and the second arm are pivotally mounted to the mounting base by inserting the second arm's main shaft into the first arm's socket and then placing the main shaft into the base's first hole causing the axis of rotation of the first arm to lie substantially concentric with the axis of rotation of the second arm. The first arm's first slot engaging feature and second arm's second slot engaging feature are then inserted into the slot where they engage and slide within the slot in the mounting plate. The cover is then fitted to the mounting plate allowing it to be vertically positioned.

This embodiment allows the cover to be depressed toward the mounting base, allowing the first and the second anti-rotation features to engage one another, thereby preventing the first arm from rotating within the mounting base. Similarly, the third and the fourth anti-rotation features also engage each other preventing the second arm from rotating within the mounting base. Additionally, when the cover is depressed, the cover's ball chain engaging feature engages the ball chain preventing it from traversing along the ball chain raceway. Since the ball chain is anchored to either or both of first or the second arms, each anchored arm is thereby also prevented from traversing along the slot in a fore-aft direction. This allows the vertical position of the cover to restrict or allow movement of the cover to relative to the mounting base in at least three degrees of freedom.

BRIEF DESCRIPTION OF THE DRAWING FIGURES

Other advantages of the present invention will be readily understood by reference to the following detailed description in connection with the accompanying drawings wherein:

FIG. 15A is a perspective view of an upper cover alongside the ball chain of FIG. 14; the figure further including an enlarged view (FIG. 15B) of the cover's ball chain engagement feature.

FIG. 16A is a cross sectional view of line 16A-16A of FIG. 14 assembled with line 16A-16A of FIG. 15A, the combined view showing the ball chain positioned between the mounting plate and the ball chain engagement feature. The Figure further includes enlarged view 16B depicting the cover's retention feature and the mounting plate's vertical retention feature.

DESCRIPTION OF THE VARIOUS EMBODIMENTS

Figure 1:
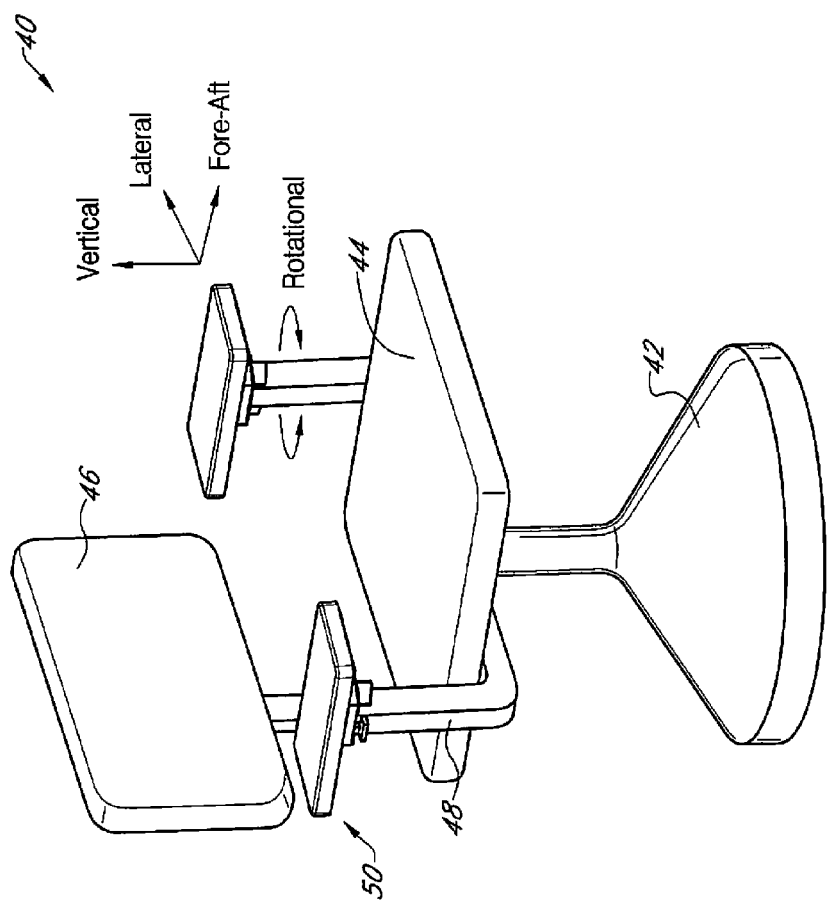
FIG. 1 is a perspective view of a chair.

For the purposes of the following description, the terms "upper," "lower," "left," "right," "front," "rear", and "horizontal" as well as derivatives of such terms shall relate to the invention as generally oriented in FIG. 1. The additional terms "Lateral", "Vertical" "Fore-Aft" and "Rotational" are particularly depicted in FIG. 1 for use in relation to a chair's armrest located in its neutral or non-adjusted position. These terms are described to aid the user in understanding particular adjustments to a chair's armrest and are not to be considered as limiting unless expressly stated otherwise. Further, it is to be understood that the invention may assume various alternative orientations and configurations, except where expressly specified to the contrary. The device illustrated in the attached drawings and described in the following specification are simply exemplary embodiments of the inventive concepts described herein. Specific dimensions and other physical characteristics relating to the embodiments disclosed herein are not to be considered as limiting unless expressly stated otherwise.

Figure 2:
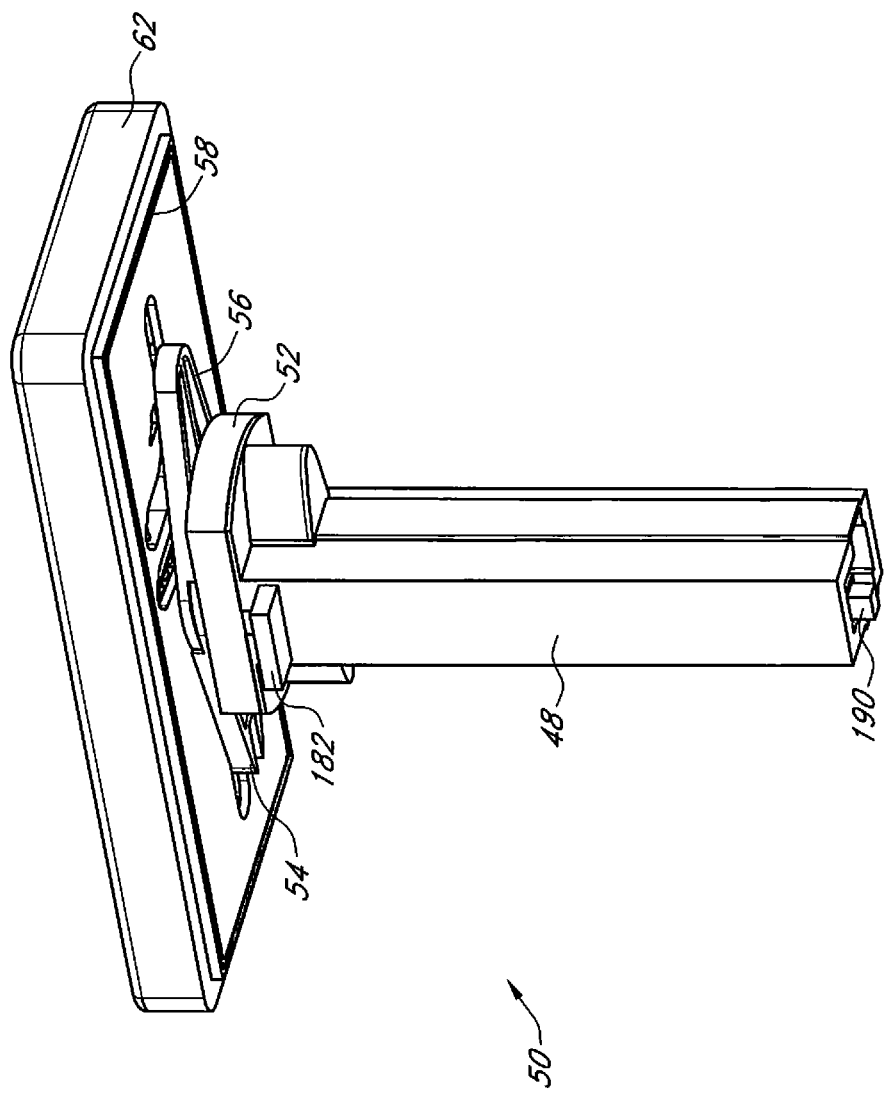
FIG. 2 is a perspective view of an adjustable armrest assembly.
Figure 3:
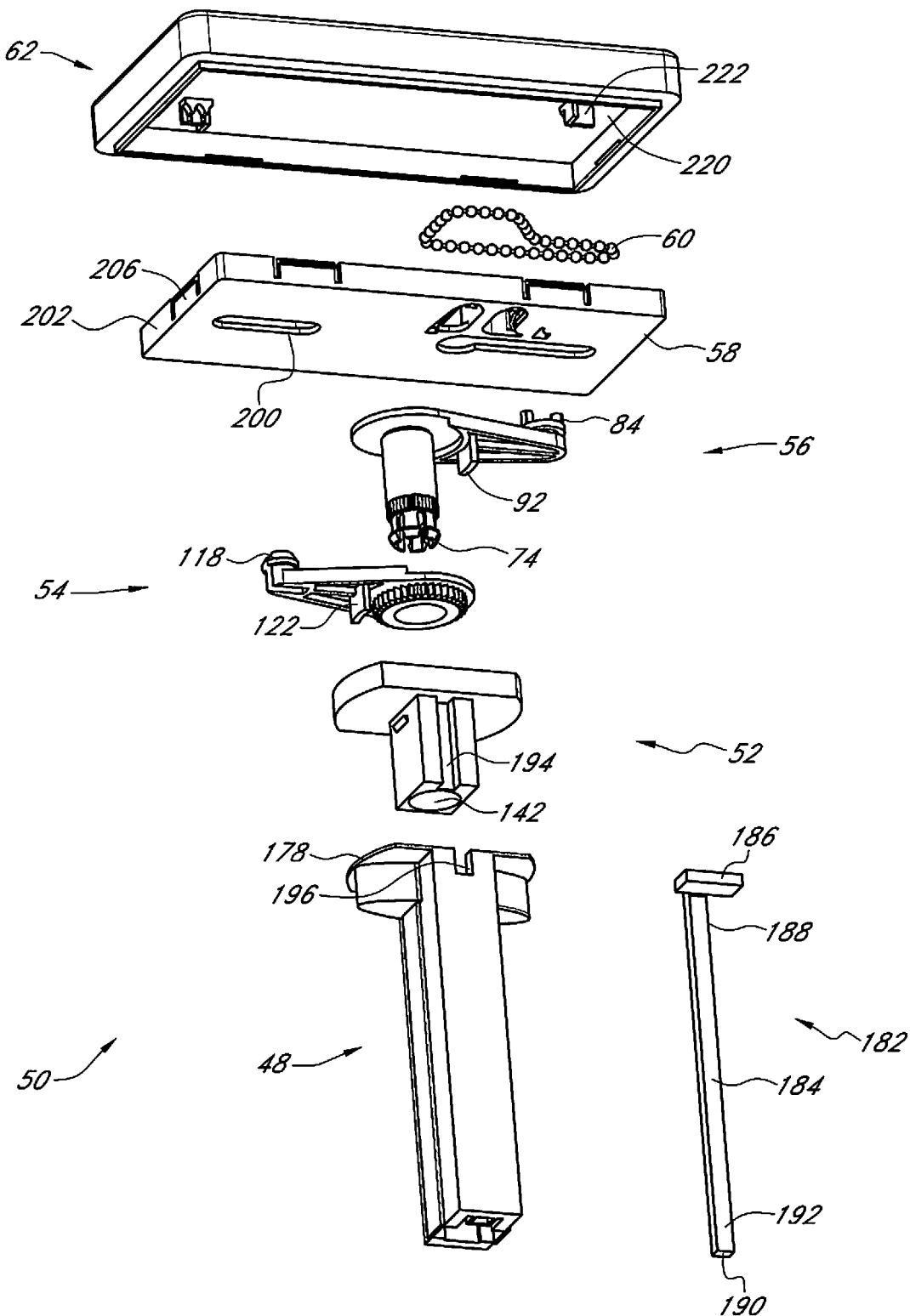
FIG. 3 is an exploded view of the adjustable armrest assembly shown in FIG. 2.

FIG. 1 shows an embodiment of a chair 40 having a frame 42, a seating surface 44, a chair back 46, an armrest column 48, and an adjustable armrest assembly 50. The armrest support column 48 is attached to the frame 42, and is adapted to receive the adjustable armrest assembly 50, which is shown in greater detail in FIG. 2, and in an exploded assembly view in FIG. 3. The adjustable armrest assembly 50 comprises a mounting base 52, a socket arm 54, a pin arm 56, a mounting plate 58, a ball chain 60, and a cover 62.

Figure 4:
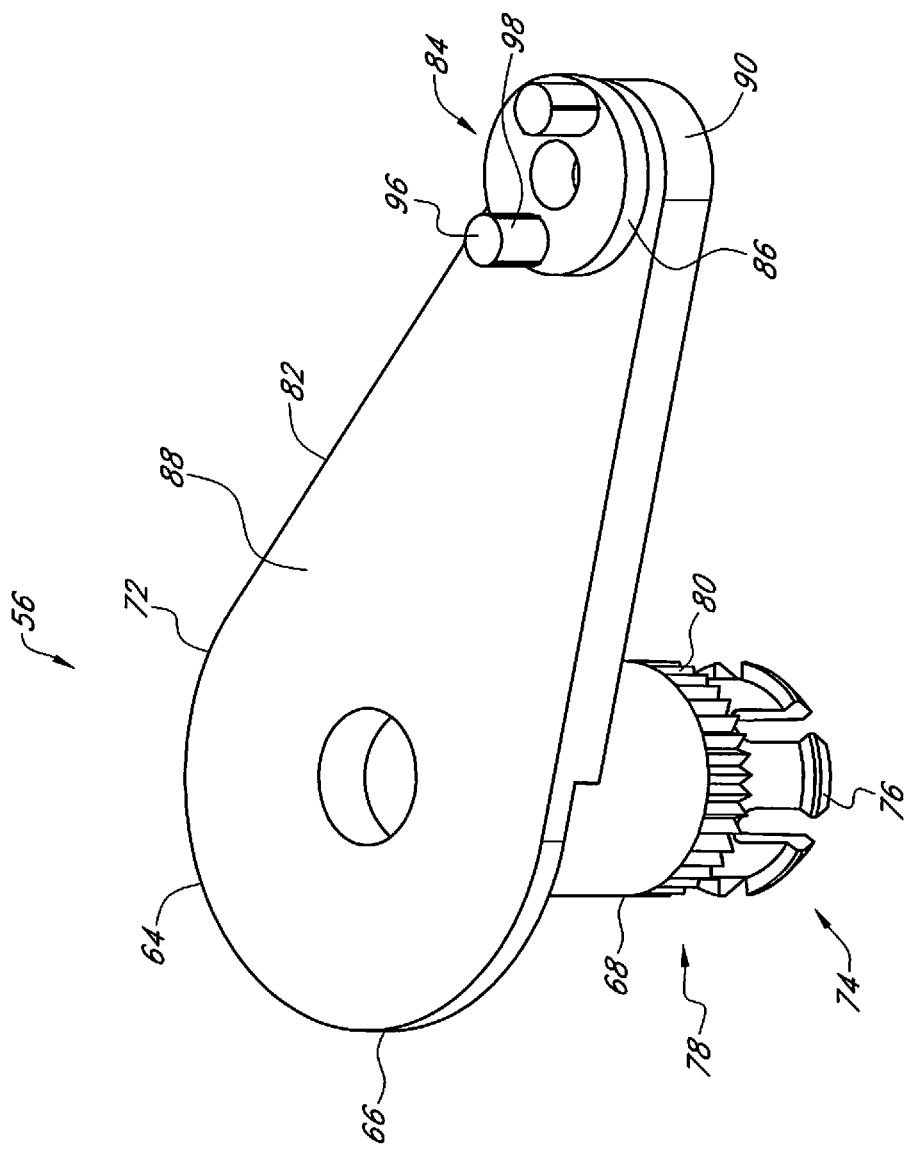
FIGS. 4 and 5 are perspective views of a pin arm.
Figure 5:
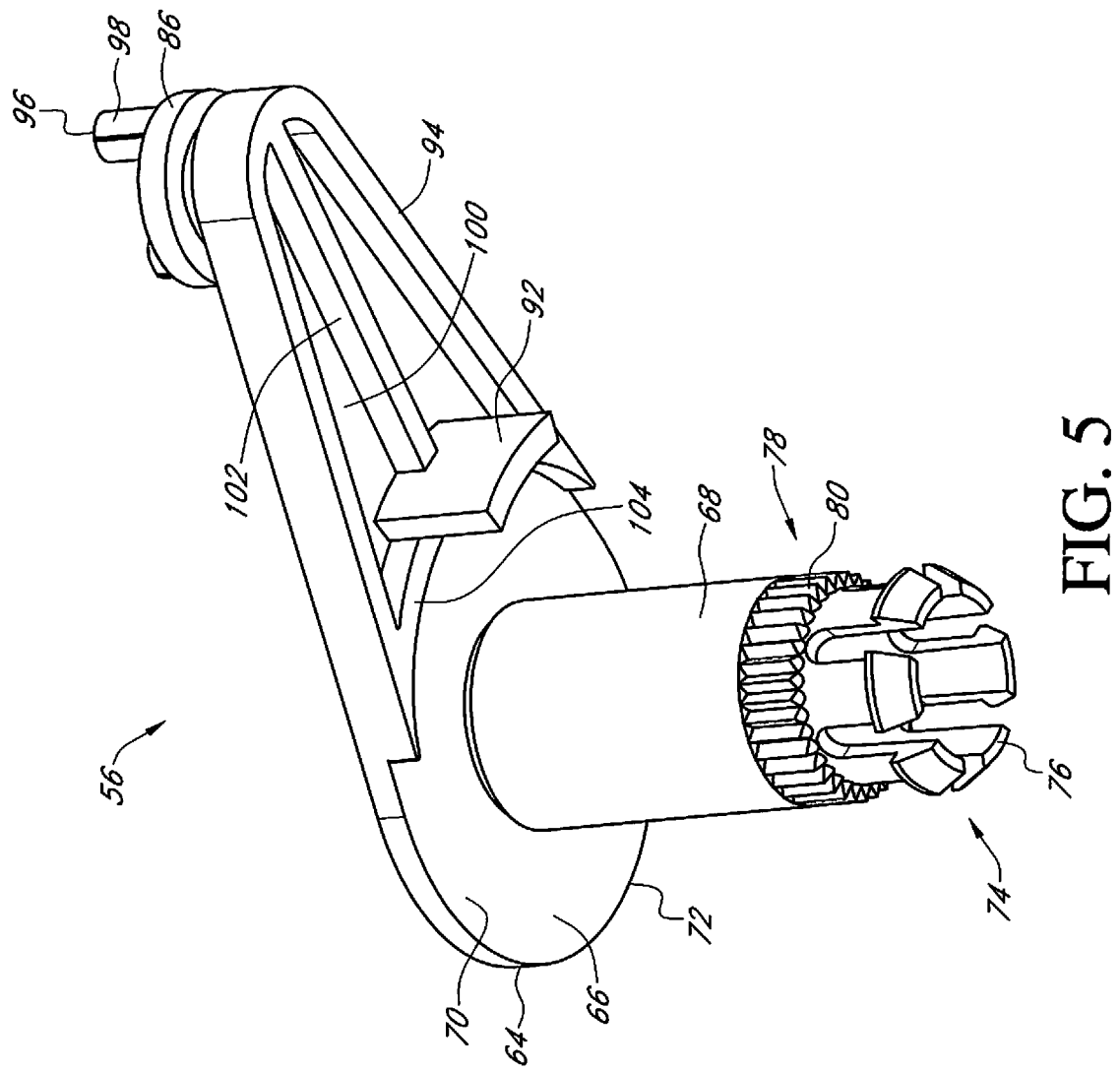

One embodiment of the pin arm 56 is shown generally in FIGS. 4 and 5. The pin arm 56 comprises a pin arm body 64, which is best shown in FIG. 4 and is preferably a circular structure 66. A main shaft 68 extends away from the underside 70 of the body 64, is cylindrical in shape 72, and is centered and normal (perpendicular) to the body 64. The main shaft 68 terminates in a main shaft retention feature 74, which is shown in FIG. 5 as a snap lock feature 76. Adjacent to the retention feature 74 is a pin arm anti-rotation feature 78, which is represented by a set of teeth 80 in the depicted embodiment.

A pin arm member 82, with a slot engagement feature 84, is attached to the pin arm's body 64, preferably along a portion of the circular structure 66. In the embodiment of the invention shown in FIG. 4, the slot engagement feature 84 is represented by a button shaped protrusion 86 extending from a top surface 88 of a distal end 90 of the pin arm member 82. A rotational stop 92 is attached to the underside 94 of the pin arm member 82. Optional ball chain retention features 96, such as pins 98, may also be included on the slot engagement feature 84, and the arm members 82 may include material reduction pockets 100, and reinforcement ribbing 102.

In one preferred form of the pin arm 56, the pin arm member's reinforcement ribbing 102 may form a wall 104 adjacent to the pin arm's body 64. This wall 104 is shaped to nest with the socket arm 54 and reduces the lateral motion between the components. A preferred material for the pin arm 56 is a 15% glass filled Nylon, however any other suitable material may be chosen which allows for a one time deformation of the main shaft retention feature 74 during assembly.

Figure 6:
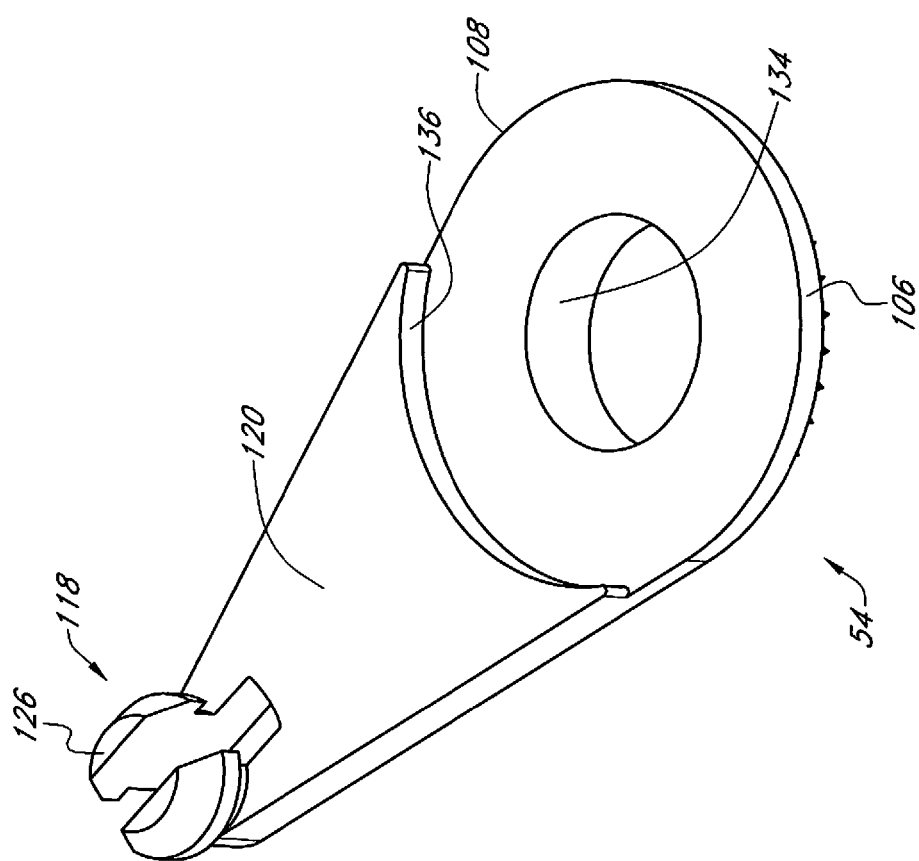
FIGS. 6 and 7 are perspective views of a socket arm.
Figure 7:
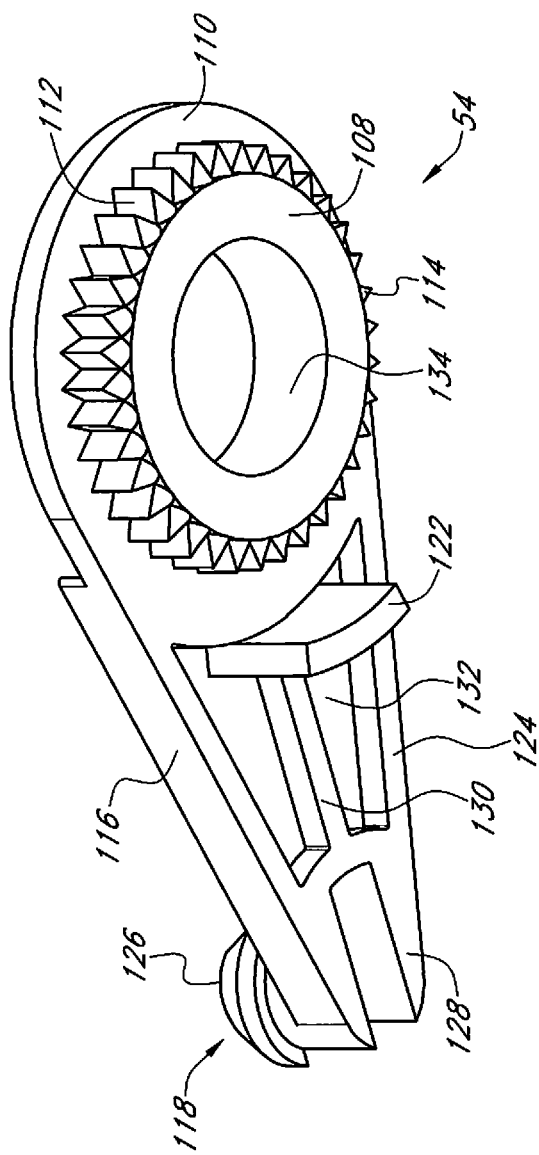
Figure 8:
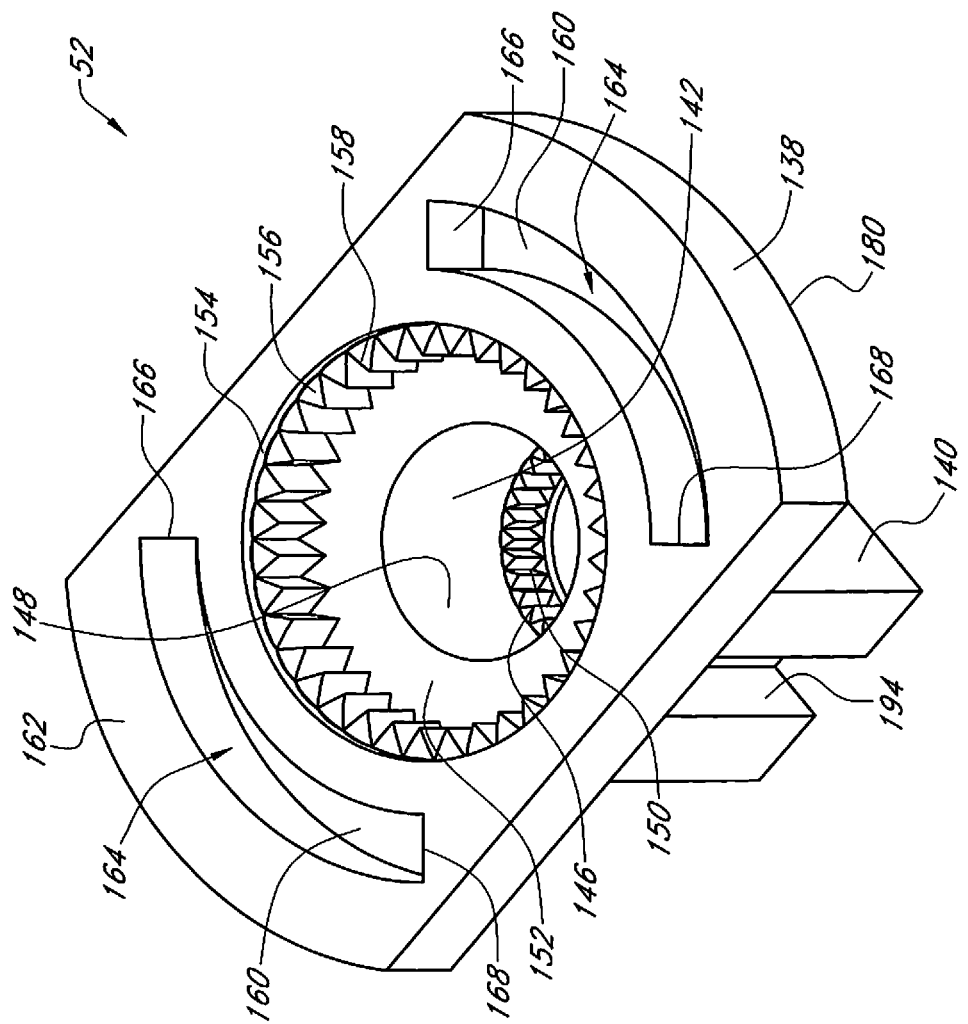
FIG. 8 is a perspective view of a mounting base.

One embodiment of the socket arm 54 is shown generally in FIGS. 6 and 7 and comprises a socket arm body 106, with a cylindrical structure 108 extending from its lower surface 110. The cylindrical structure further contains an anti-rotation feature 112, such as teeth 114. Attached to the socket arm body 106 is a socket arm member 116, which is preferably attached to the cylindrical structure 108, has a slot engagement feature 118 on its top surface 120, and a rotational stop 122 attached to the lower surface 124. In the embodiment of the invention shown in FIG. 6, the slot engagement feature 118 is represented by a mushroom shaped snap lock protrusion 126 extending from distal end 128 of the socket arm member 116. Further, the lower surface 124 of the arm member 116 depicts optional reinforcement ribbing 130, and material reduction pockets 132, which may be included to reinforce the socket arm member 116 and reduce material usage.

The socket arm body 106, further comprises a through hole 134, sized to receive the main shaft 68 of the pin arm 56, and preferably has a recess 136 (FIG. 6) in its top surface 120, sized to receive the pin arm's body 64. In a preferred form, the recess's depth is sized to allow the top surface 88 of the pin arm member 82 to lie co-planar with the top surface 120 of the socket arm member 116, and is diametrically sized to provide lateral support between the two components. A preferred material for the socket arm 54 is a Nylon 6, with 30% glass fill, creating a part with a minimum of flexure, however any other suitable material may be chosen providing it is appropriately rigid.

One embodiment of the mounting base 52 is shown in FIGS. 8, 9, 10, and 11, and comprises a base 138, a stem 140 extending away from the base 138, and a hole 142 along the stem's central axis. The hole 142 is preferably a through hole passing through both the base 138 and the stem 140, and is sized to receive the main shaft 68 of the pin arm 56. The stem 140 comprises a retention feature 144 and an anti-rotation feature 146 located in the lower portion 148 of the hole 142. This anti-rotation feature 146 mates with the anti-rotation feature 78 on the pin arm's 56 main shaft 68, and is preferably in the form of teeth 150. A counterbore 152 is placed into the base 138, preferably concentric with the through hole 142, and is sized to accept the socket arm's cylindrical structure 108. The counterbore 152 has a mating anti-rotation feature 156, such as teeth 158, located along its outer wall 154.

It is preferred that the hole 142 in the mounting base 52 is sized to fit the pin arm's main shaft 68 as far into the base 138 as possible in order to create the longest reactionary moment arm between pin arm's main shaft 68 and the mounting base's through hole 142. Thus, when the main shaft 68 is increased in length, it creates a longer reactionary moment arm which removes much of the play, or spacing tolerance, between the components in the assembly preventing the assembled components from feeling loose to the end user. Further play in the assembly may be reduced by including a draft angle on the anti-rotation features (78, 112, 146, 156) of the socket arm 54, the mounting base 52, and the pin arm 56 causing the components to contact one another as they are translated vertically downward into the mounting base 52. This creates a transitional or slight interference fit between the components when they are fully seated creating a tight fitting assembly.

One or more recesses 160 may be placed into the upper face 162 of the mounting base 52, and sized in width to create a range of motion limiter 164 for both the pin arm 56 and the socket arm 54. The range of motion limiter 164 operates by receiving the rotational stops (92, 122) of each component allowing them a limited degree of travel between a first end 166 and a second end 168. A preferred material for the mounting base 52 is a Nylon 6, with 30% glass fill, creating a part with a minimum of flexure, however any other suitable material may be chosen provided it is acceptably rigid.

Figure 9:
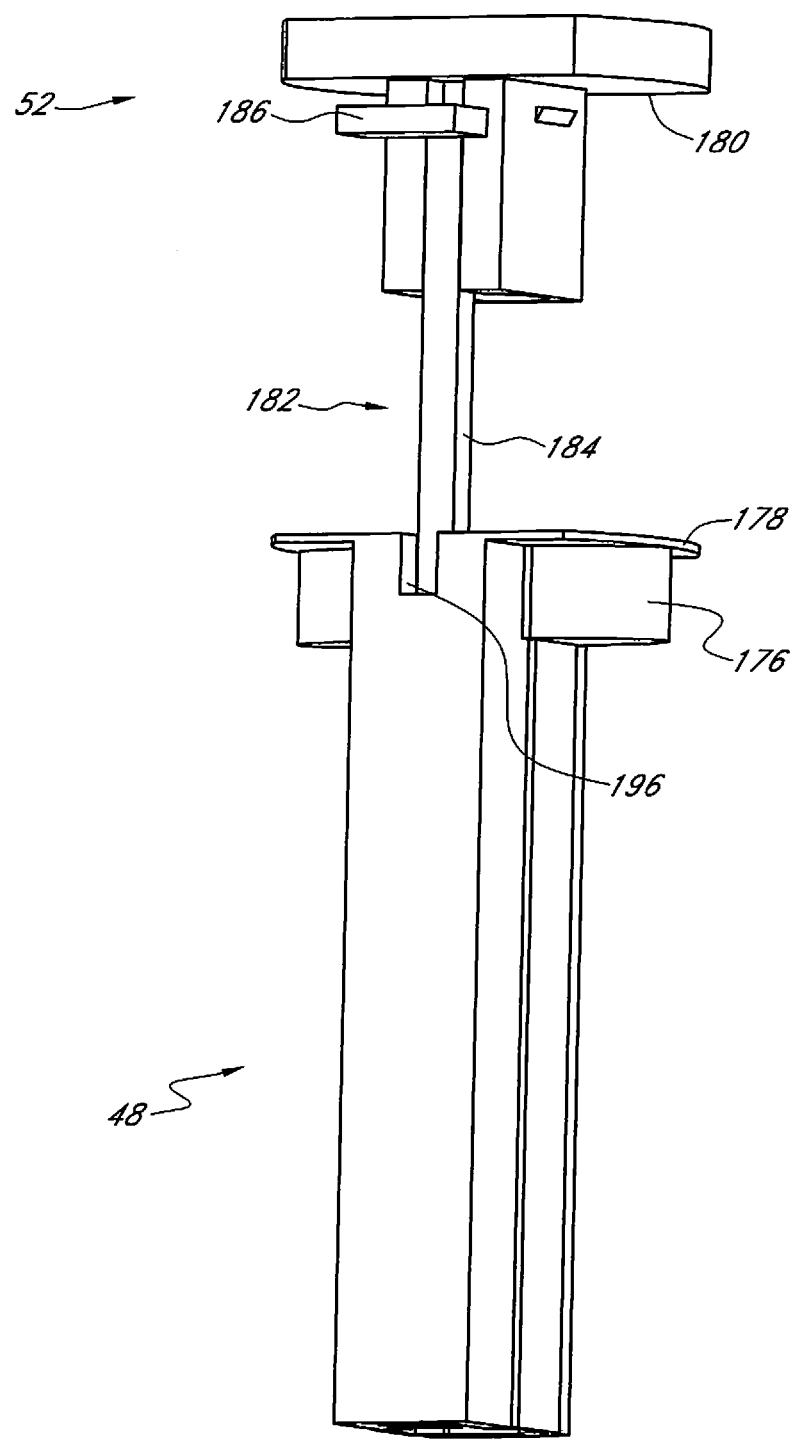
FIG. 9 is an exploded view of a mounting base, a vertical adjustment release, and a support column.
Figure 10:
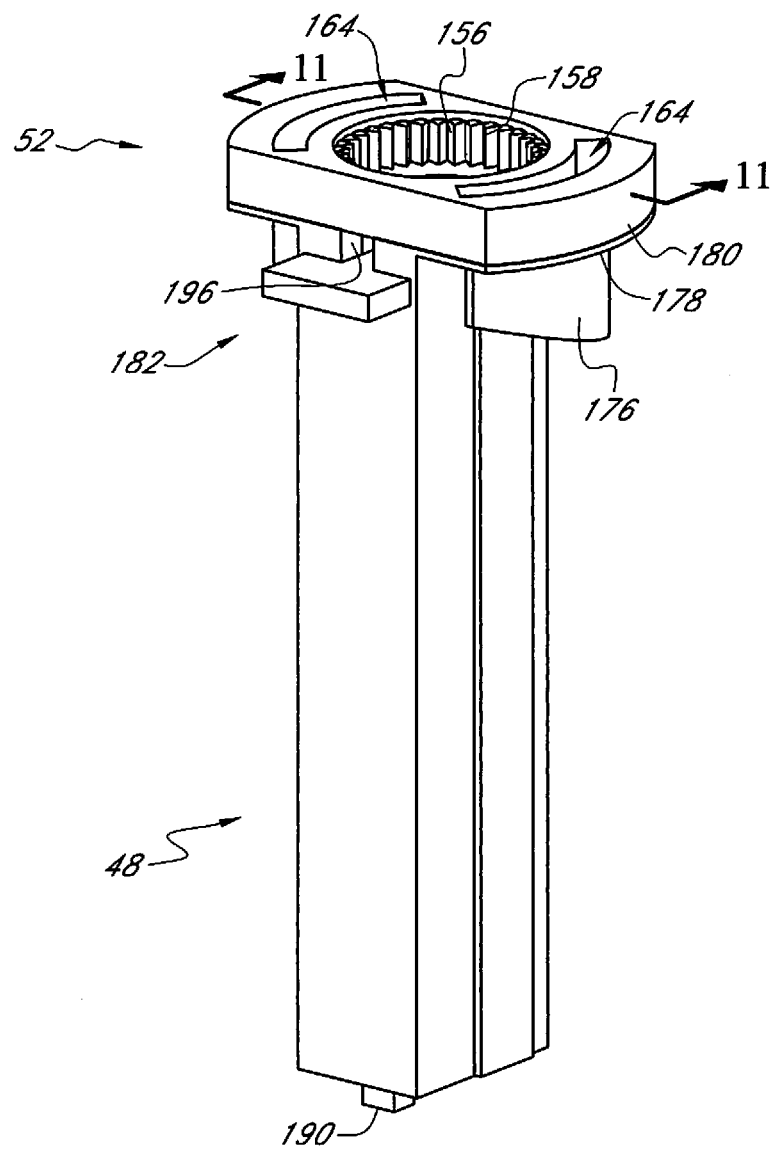
FIG. 10 is a perspective view of the mounting base, vertical adjustment, and support column shown in FIG. 9 assembled together.
Figure 11:
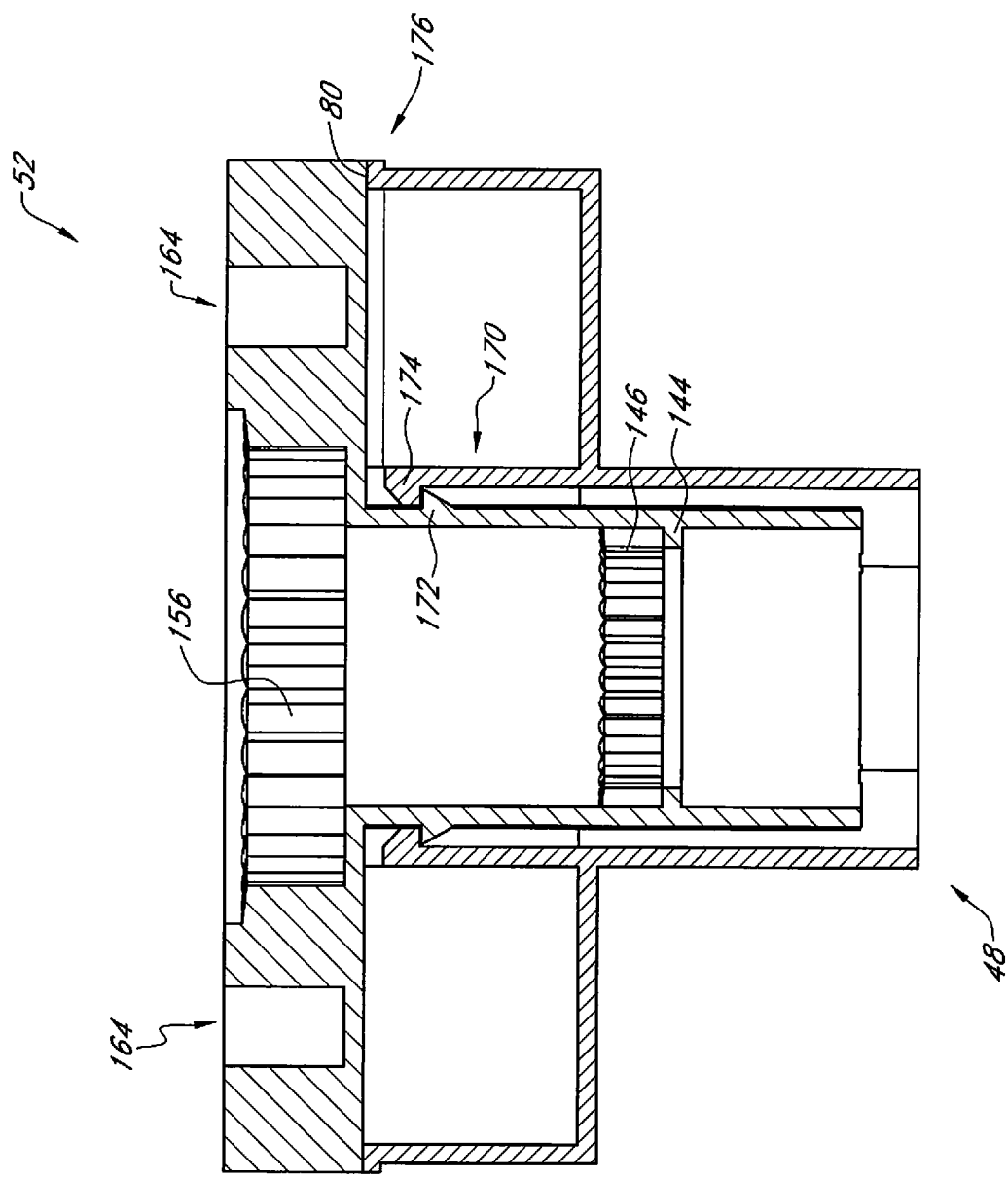
FIG. 11 is a cross sectional view along line 11-11 of FIG. 10 showing the mounting base and support column fitted together.

The mounting base 52 is preferably shaped to engage a chair's armrest column 48, one embodiment of which is shown in FIGS. 9 and 10 and in cross section in FIG. 11. In this embodiment, the mounting base 52 further comprises a set of retention features 170, such as inclined planes 172 which engage a set of locking features 174 on the armrest column 48. This embodiment further comprises one or more support structures 176 such as a support shelf 178 which lends structural support to the lower surface 180 of the mounting base 52 when assembled. An optional vertical adjustment release 182 may also be included to allow for the adjustment of the vertical position of the positionable armrest assembly 50 relative to the seating surface 44.

The optional vertical adjustment release 182 is preferably comprised of a rectangular shaft 184 with a handle portion 186 on its first end 188 and a vertical adjustment actuator 190, located on a second end 192. If the vertical adjustment release 182 is included, it is preferred that the mounting base 52 be modified by adding a vertical slot 194 (FIG. 9) sized to accommodate the rectangular shaft 184. A cutout window 196 should also be added to the armrest column 48 so that the vertical adjustment release 182 may transit vertically within the mounting base's vertical slot 194.

The optional vertical adjustment release 182 as shown in FIGS. 9 and 10, is actuated by lifting its handle potion 186 vertically. This in turn moves the rectangular shaft 184 and its vertical adjustment actuator 190, engaging a vertical adjustment mechanism (not shown) located inside of the armrest column 48. Once the vertical adjustment mechanism is actuated, the vertical height of the armrest assembly 50 may be adjusted. Vertical adjustment actuators are well known in the art, and various designs may be incorporated within the armrest column 48. A preferred material for the vertical adjustment release 182 is a Nylon 6, with 30% glass fill, creating a part with a minimum of flexure, however any other suitable material may be chosen which is suitably rigid.

Figure 12:
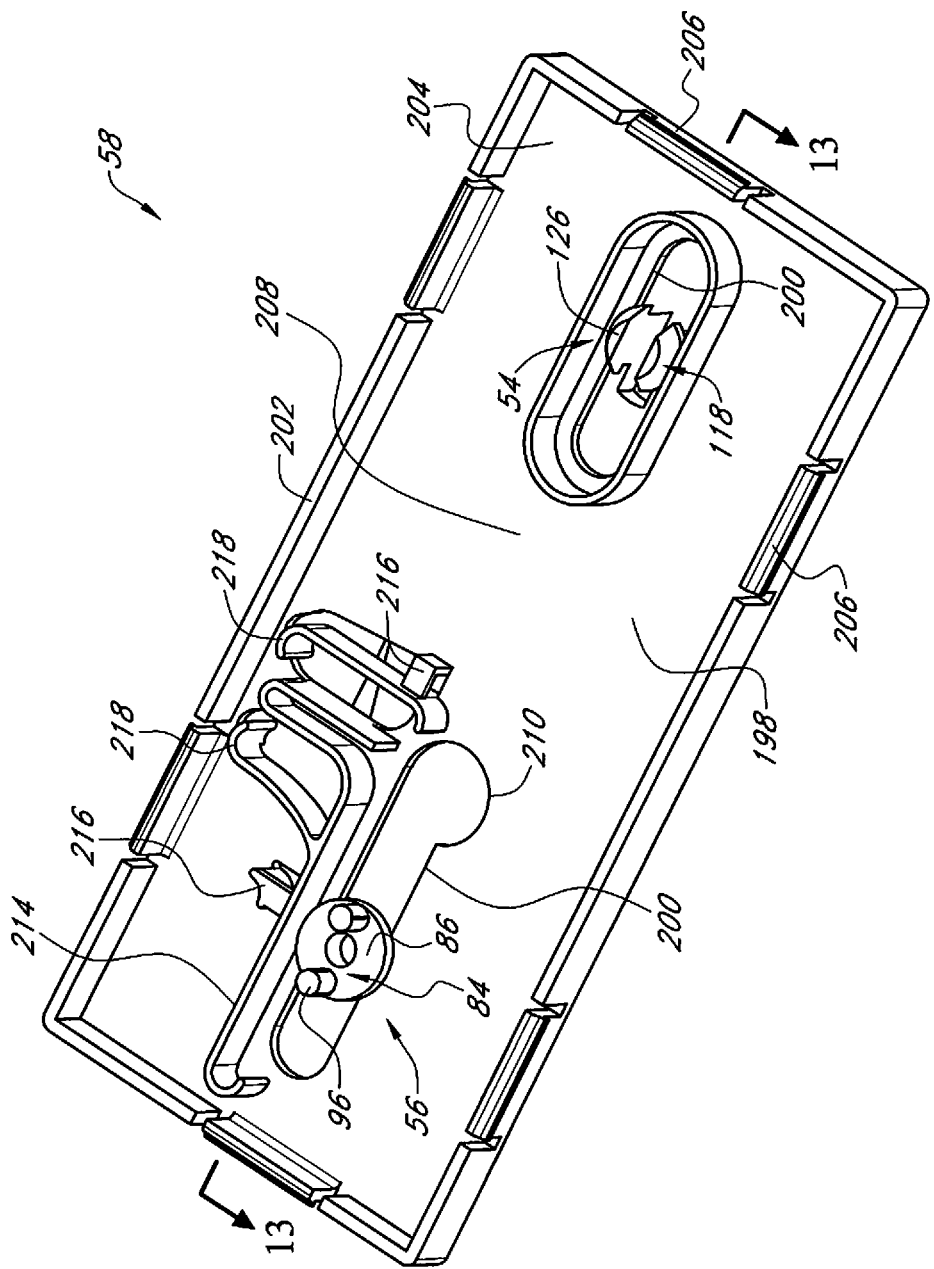
FIG. 12 is a perspective view of a mounting plate fitted with the pin arm of FIGS. 4 and 5, the socket arm of FIGS. 6 and 7, and the mounting base of FIG. 8.
Figure 13:
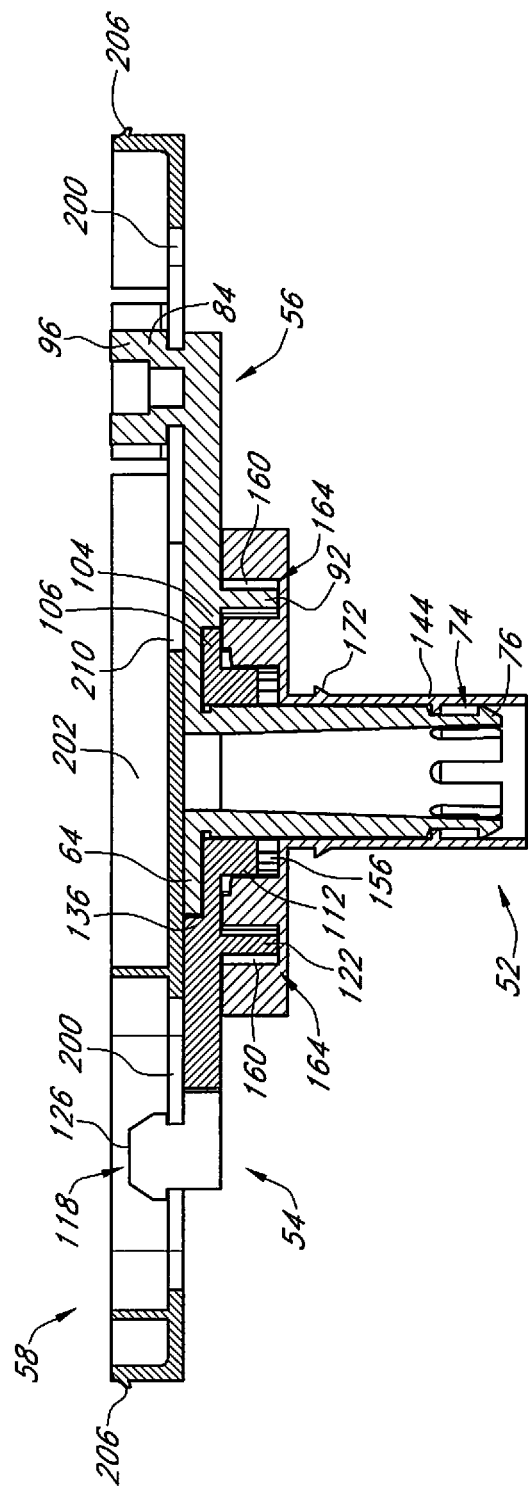
FIG. 13 is a cross sectional view along line 13-13 in FIG. 12 showing the mounting plate, pin arm, socket arm and the mounting base fitted together.
Figure 14:
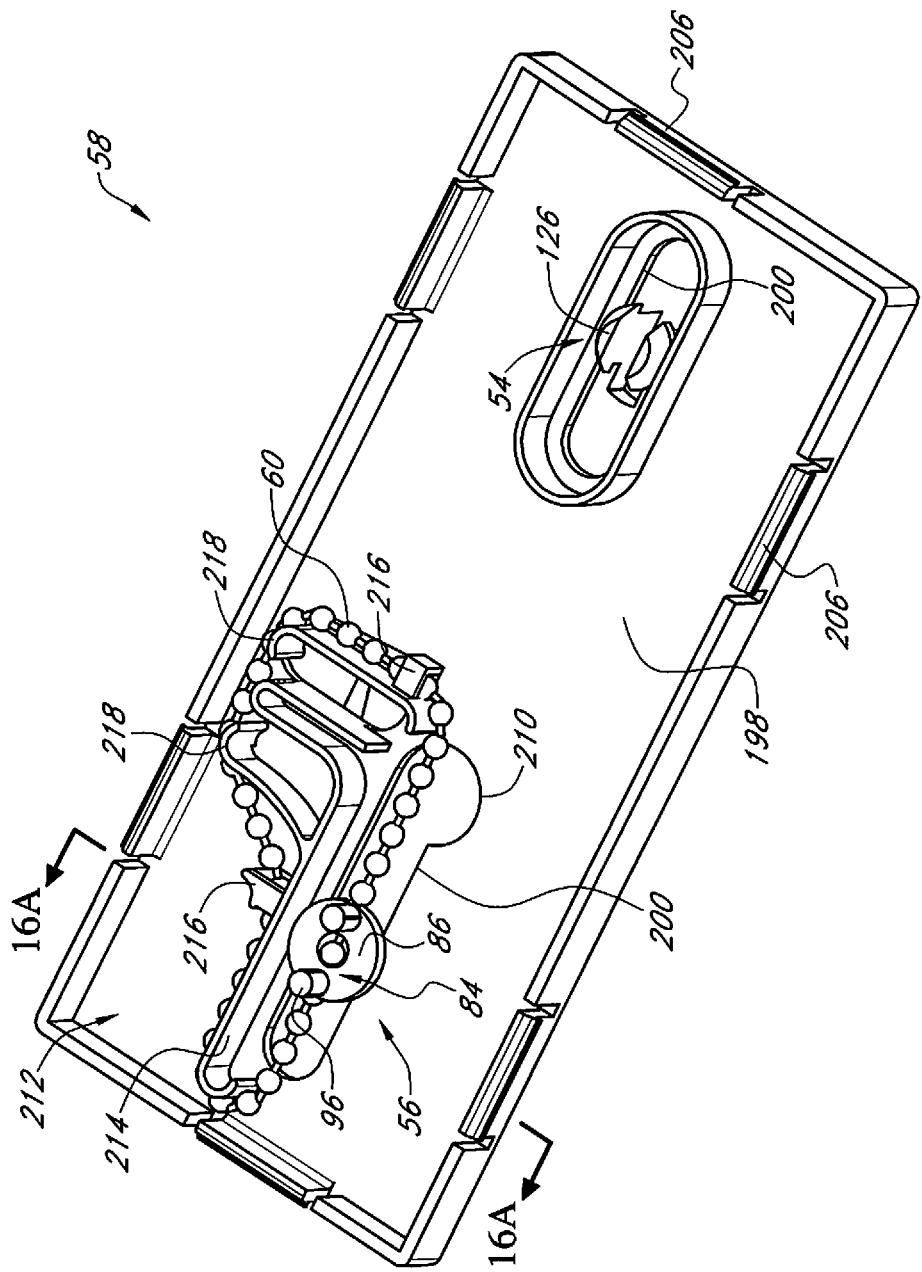
FIG. 14 is a perspective view of the mounting plate of FIG. 12 fitted with a ball chain.

One embodiment of the mounting plate 58 used with the adjustable armrest assembly 50 is shown in FIG. 12, and in cross section with the pin arm 56, socket arm 54 and mounting base 52 in FIG. 13. This embodiment of the mounting plate comprises a substantially planar base section 198, having at least one slot 200. The mounting plate 58 also preferably has a plurality of side walls 202, extending upwardly from the periphery 204 of the substantially planar base section 198. These side walls 202 preferably also have a cover retention feature 206 located near the top of the side walls 202 which allows a cover 62 (FIG. 15A) to be fitted to the mounting plate. The cover retention feature 206 is preferably placed with sufficient vertical spacing to allow the cover 62 to traverse in a vertical direction relative to the mounting plate 58 without separating from the mounting plate 58. A preferred material for the mounting plate 58 is a Nylon 6, with 30% glass fill, creating a part with a minimum of flexure, however any other suitable material may be chosen which allows for a one time deformation of the cover retention feature 206 during assembly without fracturing.

In the embodiment shown in FIGS. 12 and 13, the mounting plate 58 contains two slots 200 that pass entirely through the planar base section 198. In embodiments containing more than one slot 200, it is preferred that the plurality of slots 200 be positioned to lie co-linear with one another along the midsection 208 of the substantially planar base section 198. It is also preferred that the slots 200 be sized to receive the slot engagement features (84, 118) of the pin arm 56 and the socket arm 54. In cases where the slot engagement feature is a button shaped protrusion 86, such as that shown on the pin arm 56 in FIG. 12, a receiving window 210 should be included in the slot 200 to allow the button 86 to pass through the planar base section 198 allowing for assembly of the components. In cases where the slot engagement feature is a mushroom shaped snap lock protrusion 126, such as is shown on the socket arm 54 in FIG. 12, the slot 200 need not include a receiving window 210, as the mushroom will deflect as it is passed through the planar base section's slot 200, locking into place. Alternate attachment methods such as screws, nuts, rivets, press fit bushing, and other fastening methods which would join the slot engagement feature (84, 118) to the mounting plate 58 are suitable so long as the slot engaging feature (84, 118) may traverse along the slot 200. Since the slot engagement features (84, 118) are able to traverse the slot 200 in the mounting plate 56, a fore-aft retention system 212 is needed to limit their motion in the Fore-Aft direction (in the direction of the slot).

One form of a fore-aft retention system 212 is shown in FIGS. 14, 15A, 15B, and 16A and includes a ball chain 60 fitted to a chain raceway 214 located on the substantially planar base section 198 of the mounting plate 58. This raceway 214 preferably contains a chain retention guide 216 to prevent the ball chain 60 from lifting away from the mounting plate 58, and a tensioner 218 which keeps the ball chain taught. In the embodiment shown in FIG. 14, the ball chain 60 is attached to the pin arm's slot engagement feature 84. Sonic welding, glue, or other fastening means may be used so long as the ball chain stays attached to the slot engagement feature 84. The ball chain 60 is thus forced to traverse the raceway 214 whenever the pin arm's slot engagement feature 84 moves along the slot 200 in the mounting plate 58. Should the ball chain 60 be restrained at any point along the raceway 214, the pin arm 56 will likewise be restrained.

FIGS. 15A and 15B depicts the ball chain 60 along with an upper cover 62 containing a ball chain engaging feature 220, such as teeth 222. When the upper cover 62 is attached to the mounting plate 58, as in FIG. 16A (Combined section along lines 16A-16A in FIGS. 14 and 15A), and moved toward the mounting plate 58 (Engaged Configuration, FIG. 17B) the ball chain 60 becomes trapped between the chain engaging feature 220 in the upper cover 62 and the planar base section of the mounting plate 198. This prevents the ball chain 60 from traversing the raceway 214, and thereby prevents the pin arm's slot engaging feature 84 from traversing the slot 200 in the mounting plate 58. With the pin arm 56 restrained, the attached mounting plate 58 is also prevented from traversing in the fore-aft direction.

As is shown in the enlarged view of FIG. 16B, the cover 62 further comprises a vertical retention feature 224 which allows the cover 62 to be lifted away from the mounting plate 58 at a sufficient height to allow the chain engaging feature 220 to separate from the ball chain 60. This allows the pin arm's slot engaging feature 84 to freely traverse within the slot 200. This raised vertical orientation is called the 'Disengaged' configuration. The cover's vertical retention feature 224 prevents the cover 62 from separating from the mounting plate 58 in this configuration. A preferred material for the cover 62 is a 10% Glass filled polypropylene, however any other suitable material may be chosen which allows for a one time deformation of the vertical retention feature 224 during assembly without fracturing.

One method of assembling the adjustable armrest assembly 50 includes fitting the main shaft 68 of the pin arm 56 into the through hole 134 of the socket arm 54. The slot engaging feature 84 of the pin arm 56 is then fitted to the slot 200 of the mounting plate 58, and in the particular example shown in FIG. 12, the pin arm's button shaped protrusion 86 is fitted into the receiving window 210 of the slot 200 in the mounting plate 58. The slot engaging feature 118 of the socket arm 54 is then fitted to the slot 200 by forcing the mushroom shaped snap lock protrusion 126 through the slot 200. The main shaft 68 of the pin arm 56 is then fitted to the hole 142 in the mounting base 52, until the main shaft retention feature 74 engages the retention feature 144 of the mounting base 52. The rotational stops 92, 122 of the pin arm 56 and socket arm 54 are then aligned with the recess 160 in the upper face 162 of the mounting base 52, creating the range of motion limiter 164 for arms (54, 56). A fore-aft retention system 212, such as the ball chain 60, is then fitted to the mounting plate 58 and then the cover 62 is then fitted over the mounting plate as shown in FIGS. 16A and 16B. In the embodiment shown therein, the vertical retention feature 224 located on the side wall 226 of the cover 62 is passed over cover retention feature 206 located near the top of the side walls 202 on the mounting plate 58, retaining the cover 62 to the mounting plate 58 and completing the adjustable armrest assembly 50.

Figure 17A:
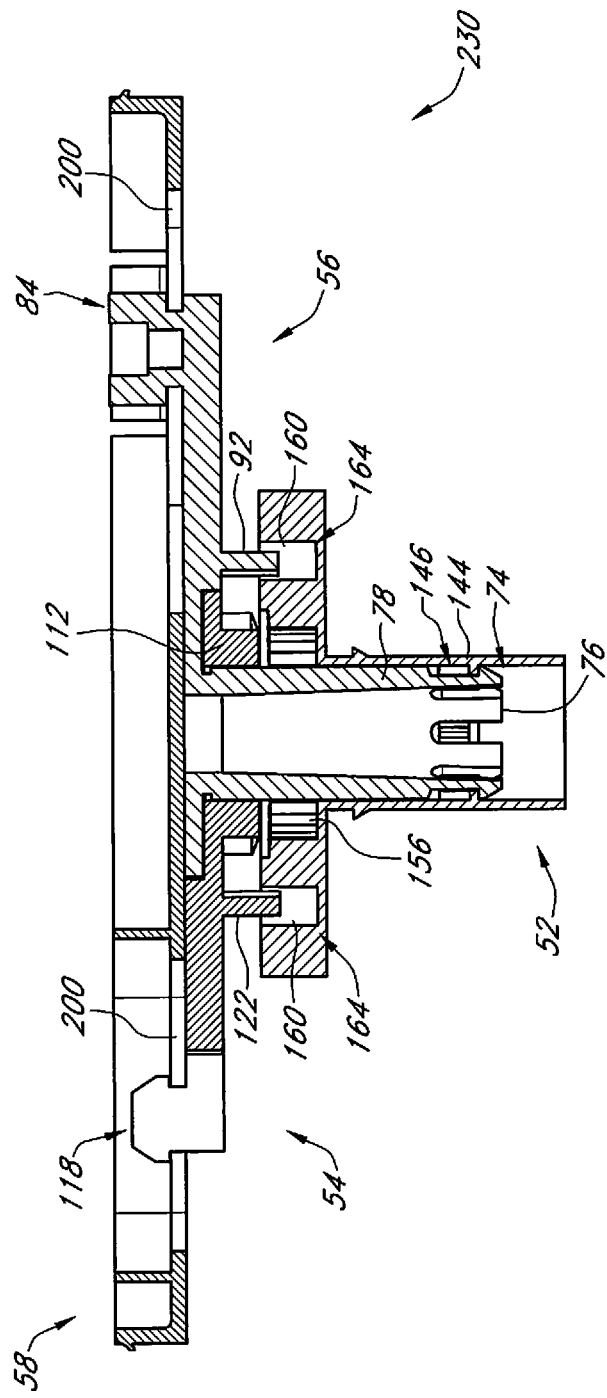
FIG. 17 is a cross sectional view of FIG. 12 taken along line 13-13 showing the assembly in an 'Disengaged' (17A) and 'Engaged' (17B) configuration.
Figure 17B:
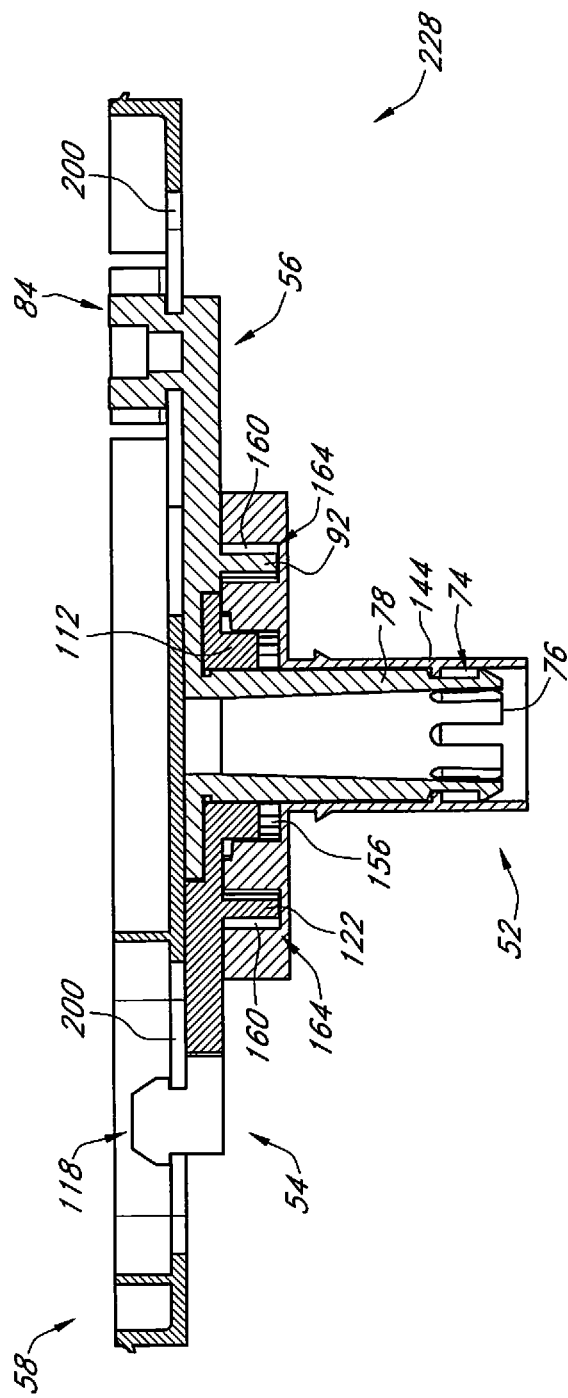
Figure 18:
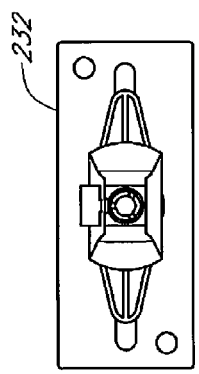
FIG. 18 is a bottom view of the adjustable armrest assembly positioned in a 'neutral' orientation.
Figure 19:
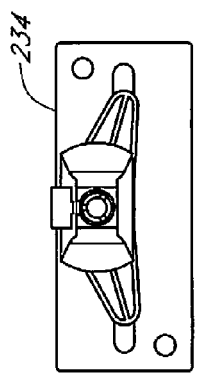
FIG. 19 is a bottom view of the adjustable armrest assembly positioned in a 'lateral right' orientation.
Figure 20:
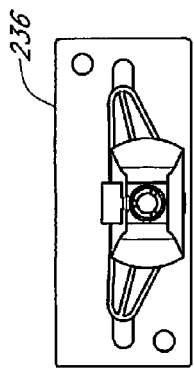
FIG. 20 is a bottom view of the adjustable armrest assembly positioned in a 'lateral left' orientation.
Figure 21:
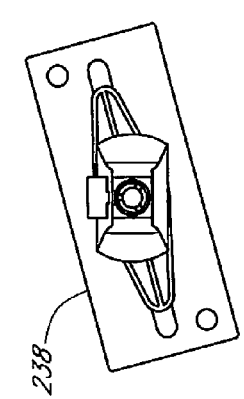
FIG. 21 is a bottom view of the adjustable armrest assembly rotated in a 'counter-clockwise' direction.
Figure 22:
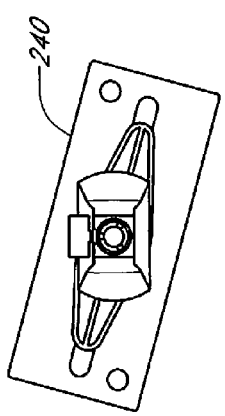
FIG. 22 is a bottom view of the adjustable armrest assembly rotated in a 'clockwise' direction.

In operation the positionable armrest assembly 50 comprises at least two configurations: an 'Engaged' 228 configuration and a 'Disengaged' 230 configuration. One embodiment of the invention is shown in FIG. 17 in both configurations. In the 'Engaged' 228 configuration the anti-rotation features (78, 112) on the pin 56 and socket arms 54, engage the anti-rotation features (146, 156) on the mounting base 52, preventing the pin arm 56 and the socket arm 54 from rotating. This prevents the mounting plate 58 from translating laterally or rotating about the mounting base 52. The assembly is 'Disengaged' 230 by lifting the mounting plate 58 vertically, which causes the attached pin arm 56 and socket arm 54 to lift vertically since they are coupled to the mounting plate 58 via their slot engaging feature (84, 118). When the pin arm 56 and socket arm 54 are lifted vertically, they separate from the anti-rotation (146, 156), features on the mounting base 52, allowing the pin arm 56 and socket arm 54 to rotate. This allows the mounting plate 58 to be positioned from a neutral position 232, in FIG. 18, to a 'Lateral Right' orientation 234 shown in FIG. 19, a 'Lateral Left' orientation 236 shown in FIG. 20, as well as a 'Clockwise' orientation 238 shown in FIG. 21, and a 'Counterclockwise' orientation 240 shown in FIG. 22, as well as in any intermediate positions there between. Lateral motion and rotations are accomplished through the rotation of the arms (54, 56) within the mounting base 52, causing their respective slot engaging features (84, 118) to slide along the slot 200.

Additionally, since the cover 62 is vertically positionable relative to the mounting plate 58, the cover 62 may be lowered proximate to the mounting plate 58 while in the 'Engaged' configuration 228 as shown in FIG. 16. In this 'Engaged' configuration the ball chain engaging feature 220, engages the ball chain 60, preventing the slot engaging feature 84 of the pin arm 56 from translating along the slot 200 in the mounting plate 58. Since this motion along the slot 200 is generally in the fore-aft direction, any device restraining this motion may be referred to as a fore-aft restraint. Here, the fore-aft restraint prevents translation along the direction of the slot of the mounting plate 58 and the cover 62 relative to the mounting base 52.

Figure 23:
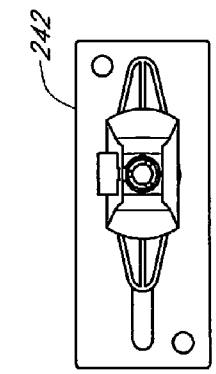
FIG. 23 is a bottom view of the adjustable armrest assembly positioned in a 'fore' orientation.
Figure 24:
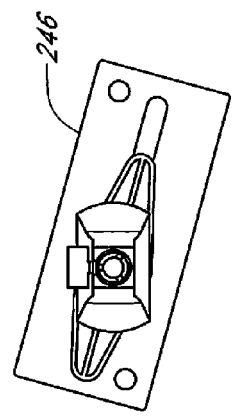
FIG. 24 is a bottom view of the adjustable armrest assembly positioned in an 'aft' orientation.

Similarly, when the cover 64 is moved vertically away from the mounting plate 58 ('Disengaged configuration' 230), the ball chain engaging feature 220 separates from the ball chain 60, allowing the slot engaging feature 84 of the pin arm 56 to translate along the slot 200 in the mounting plate 58. This allows the fore-aft translation of the mounting plate 58 and cover 62 relative to the mounting base 52. This fore-aft translation is shown in FIGS. 23 and 24, wherein the mounting plate 58 is positioned into a 'Fore' orientation 242 in FIG. 23, and into an 'Aft' orientation 244 in FIG. 24.

Figure 25:
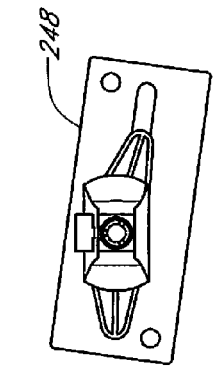
FIG. 25 is a bottom view of the adjustable armrest assembly positioned with a combination of an 'aft' orientation and a 'clockwise' rotation.
Figure 26:
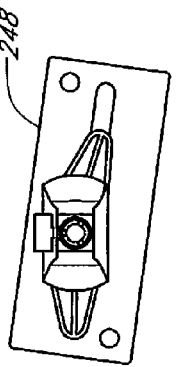
FIG. 26 is a bottom view of the adjustable armrest assembly positioned with a combination of an 'aft' and 'lateral right' orientation in combination with a 'clockwise' rotation.

In operation, the cover 62 is coupled to the mounting plate 58 when the vertical retention feature 224 on the cover engages the cover retention feature 206 on the mounting plate 58. A vertical motion applied to the cover 62 results in a vertical translation of the mounting plate 58, which in turn lifts the pin arm 56 and the socket arm 54 away from the mounting base 52, causing their anti-rotation features to decouple. Therefore, a single upward vertical motion, when applied to the cover 62, can disengage the armrest assembly's 50 anti-rotation features (78, 112, 146, 156) and the ball chain engagement feature 220 simultaneously, thereby allowing the armrest assembly 50 to be positioned in a combination of orientations such as Aft/Counter clockwise 246 in FIG. 25, and Aft/Counterclockwise/Lateral right 248 in FIG. 26.

Figure 27:
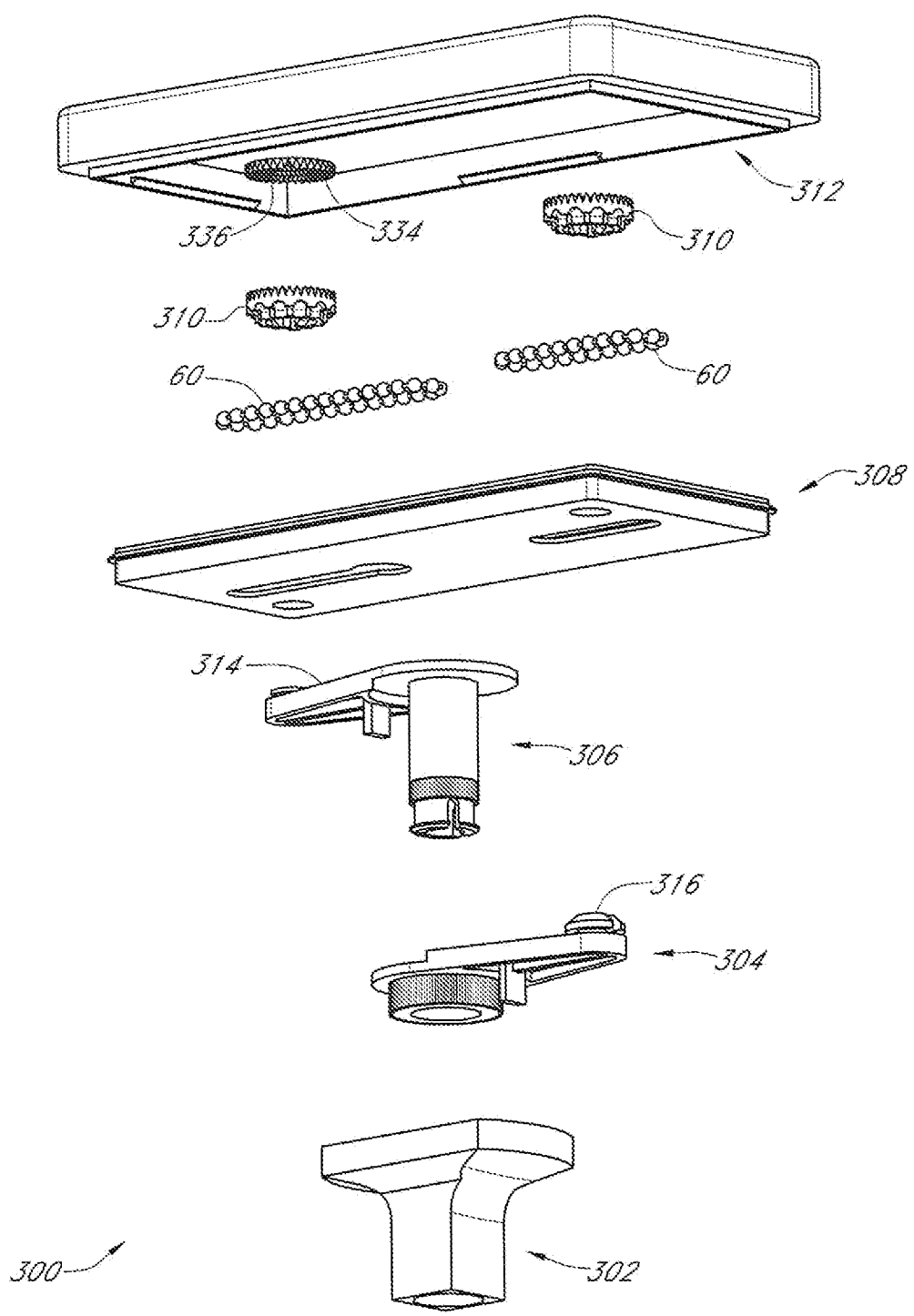
FIG. 27 is a perspective view of an alternate embodiment of an adjustable armrest assembly.

Additional embodiments of the inventive idea expressed herein include but are not limited to, an alternate embodiment of the armrest assembly 300 as shown in FIG. 27, which demonstrates some of the anticipated variations usable with the novel armrest assembly. This exemplary embodiment comprises a mounting column 302, an alternate socket arm 304, an alternate pin arm 306, an alternate mounting plate 308, a ball chain 60, a ball gear 310, and an alternate cover 312.

The alternate pin arm 306 and alternate socket arm 304 are similar to the pin arm 56 and socket arm 54 used with previous assembly, however the alternate pin arm 306 and alternate socket arms 304 are modified in that they are both capable of engaging a separate ball chain 60 via their respective slot engaging features (314, 316).

Figure 28:
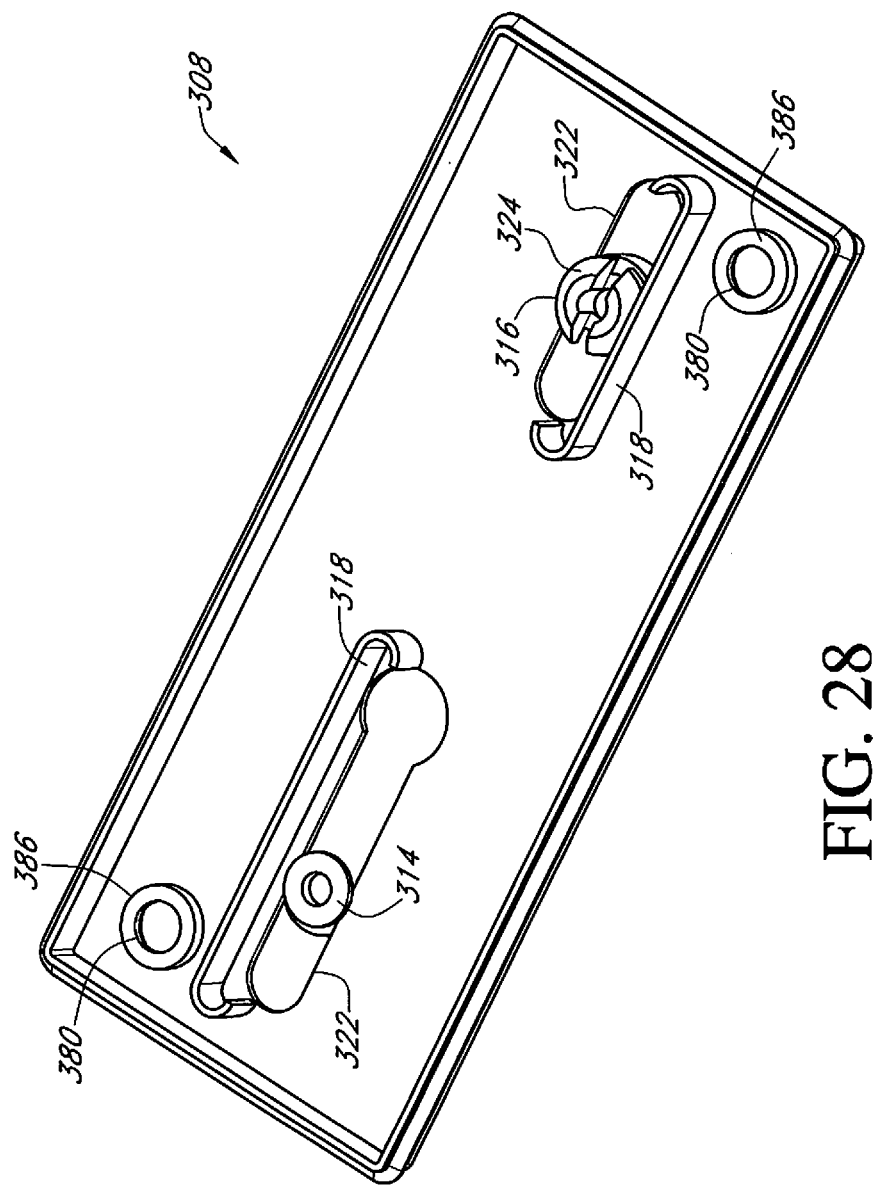
FIG. 28 is a perspective view of alternate embodiments of the mounting plate, pin arm, and socket arms in FIG. 27 fitted together.

A mounting column 302, shown in FIG. 27, is similar to the mounting base 52 shown in FIG. 9, however it is altered by combining the previous armrest column 48 and mounting base 52 into a single part. An alternate mounting plate 308, shown in FIG. 28, is similar to the mounting plate 58 in FIG. 14, but is modified to have two chain raceways 318 for its alternate fore-aft restraint system 320. In this embodiment a ball gear 310 engages a ball chain 60, which restrains the fore-aft orientation of the alternate cover 312 relative to the mounting column 302.

Figure 30:
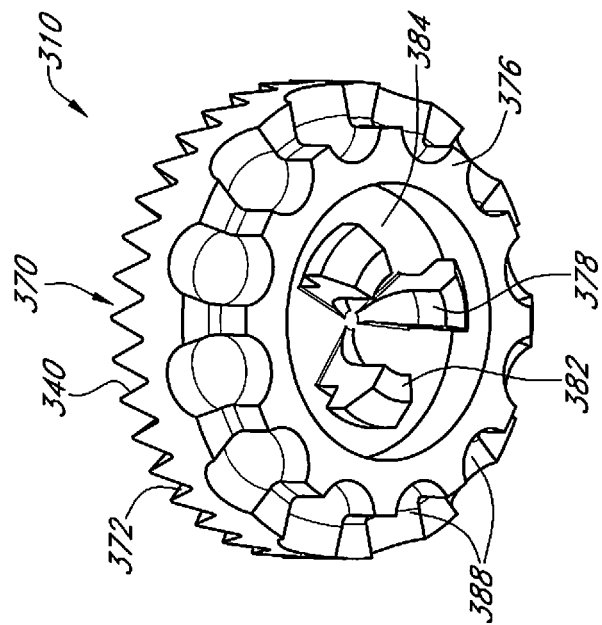
FIGS. 29 and 30 are perspective views of a ball gear.
Figure 29:
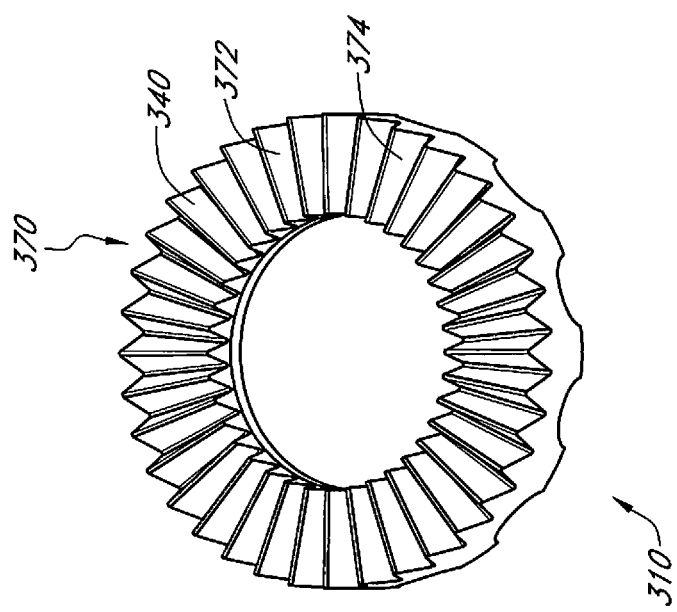

One embodiment of the ball gear 310 is shown in FIGS. 29 and 30, and includes an anti-rotation feature 370 on its upper surface 340. The anti-rotation feature preferably includes a mechanical lock or a friction inducing surface 372, such as a set of teeth 374. The lower surface 376 of the ball gear 310 has a retention feature 378, which is assembled to a ball gear mounting hole 380 placed through the alternate mounting plate 308 (See FIG. 31), anchoring the ball gear 310 to the alternate mounting plate 308 in a manner that allows it to freely rotate. The retention feature 378 as shown in FIG. 30, comprises a set of snap locking features 382 spaced equidistant to one another in a circular pattern. The ball gear 310 further includes a circular recess 384 on its lower surface 376 which mates with and receives support from a raised circular support 386 (FIG. 28) on the alternate mounting plate 308. The lower surface 376 of the ball gear 310 further comprises a set of ball engagement recesses 388, which are sized to engage the individual balls 390 of a ball chain 60 used with the alternate embodiment of the armrest assembly 300. A preferred material for the ball gear 310 is an acetyl plastic, which allows for deformation of the snap lock feature 382 during assembly, but provides a low coefficient of friction to the alternate mounting plate 308. Alternately, any other suitable material may also be utilized.

Figure 31:
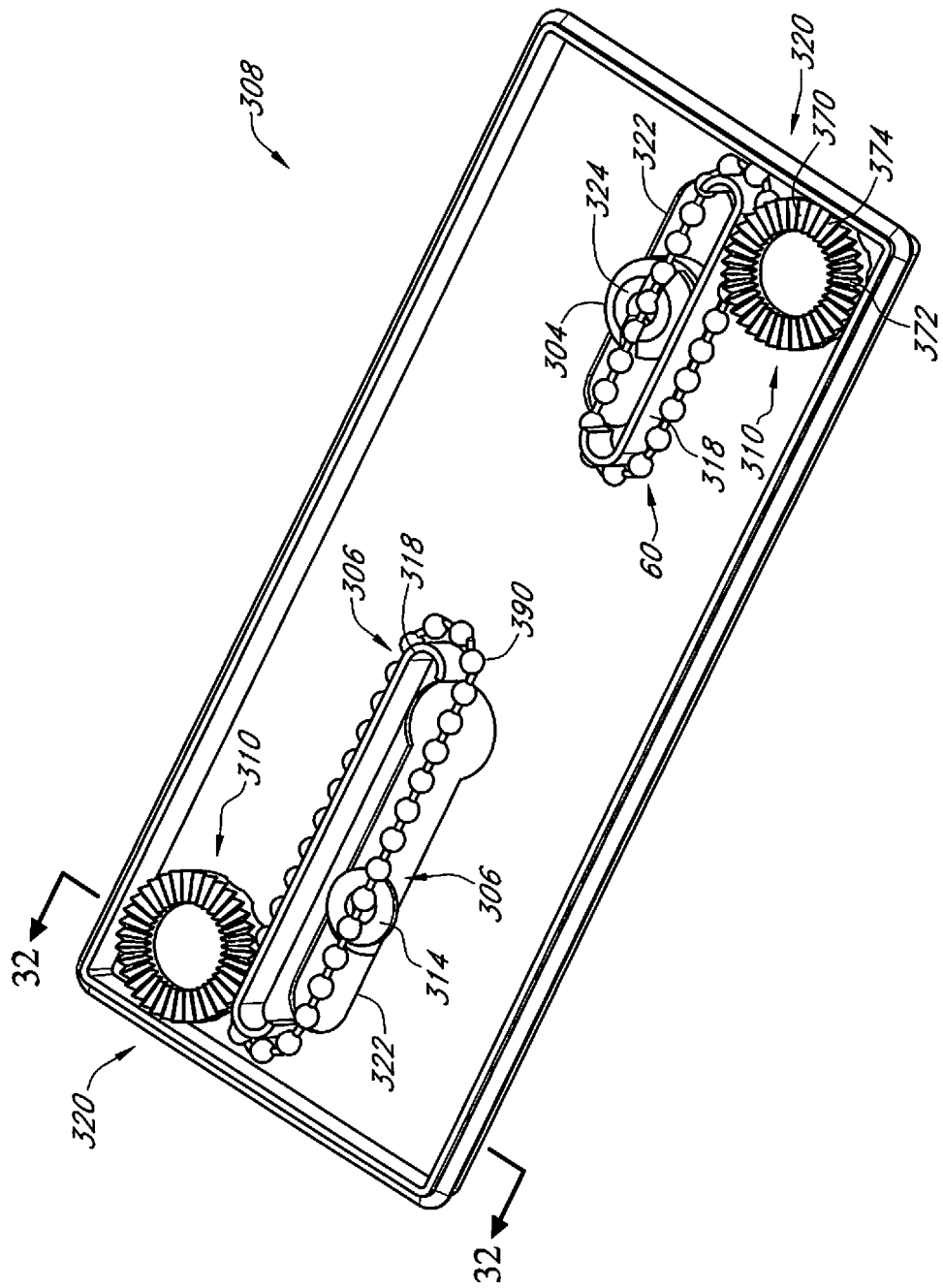
FIG. 31 is a perspective view of the alternate mounting plate, pin arm, and socket arms shown in FIG. 28, this figure also includes a ball chain and two ball gears as depicted in FIGS. 29 and 30.
Figure 32:
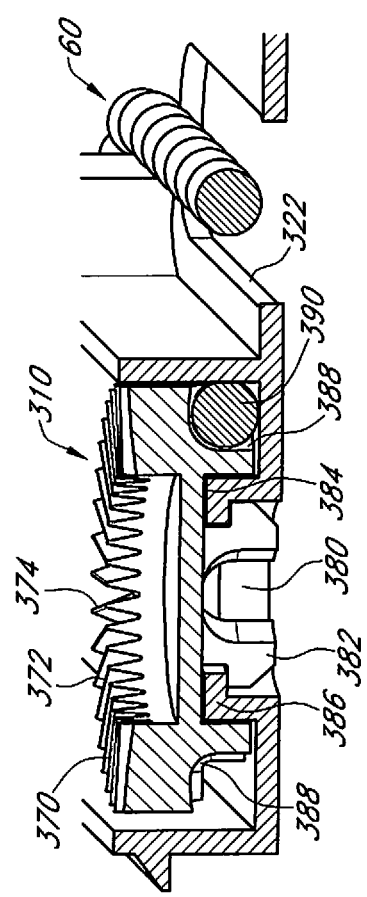
FIG. 32 is a cross sectional view taken along line 32-32 from FIG. 31 showing the ball chain interfacing with a ball gear.

The ball gear 310 is shown installed on the alternate mounting plate 308 in FIG. 31, however prior to mounting the ball gear 310 to the alternate mounting plate 308, the ball chain 60 is formed into a loop by cutting the chain and joining its ends together. The ball chain 60, is then fitted around the two chain raceways 318, and then the ball gear 310 is assembled to the alternate mounting plate 308, engaging the ball engagement recesses 388 of the ball gear 310 as shown in cross section in FIG. 32. A preferred material for the ball chain 60 may be stainless steel, other suitable material may be chosen, including polymeric materials such as plastics. Similarly, the ball chain 60 may be substituted with wire cabling, traditional linked chain, rubber belts, or any other similar product.

The two chain raceways 318, best shown in FIG. 31, control the position of the ball chains 60 over top the two slots 322. The ball chain 60 is anchored to the slot engaging features (314, 316) of the alternate pin arm 306 and alternate socket arm 304, by glue, friction welding, or any other suitable retention method, including capturing the ball chain 60 in between the tines of a mushroom shaped snap lock protrusion 324.

Figure 33:
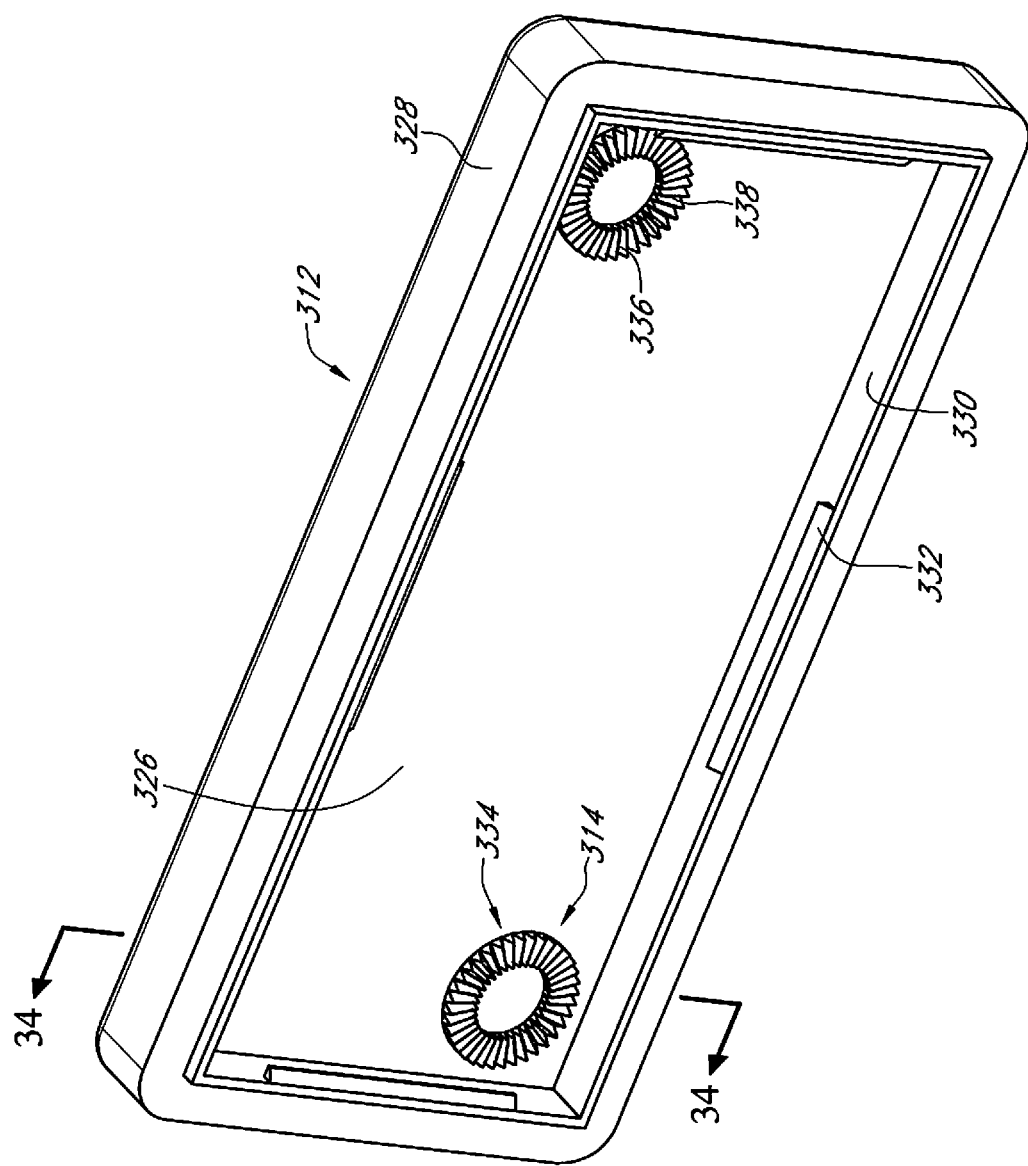
FIG. 33 is a perspective view of an alternate cover.

One embodiment of the alternate cover 312 is shown in FIG. 33 and includes a substantially planar cover plate 326, an optional soft covering 328 such as reaction injection molded foam or another soft material, a plurality of side walls 330 sized to fit over the alternate mounting plate 308, a vertical retention feature 332, and a fore-aft retention feature 334. In the depicted embodiment, the fore-aft retention feature 334 comprises a ball gear engagement surface 336 in the shape of teeth 338 molded into the cover, and positioned to engage and restrain the upper surface 340 of the ball gear 310 when the alternate cover 312 is brought proximate the alternate mounting plate 308.

Figure 34:
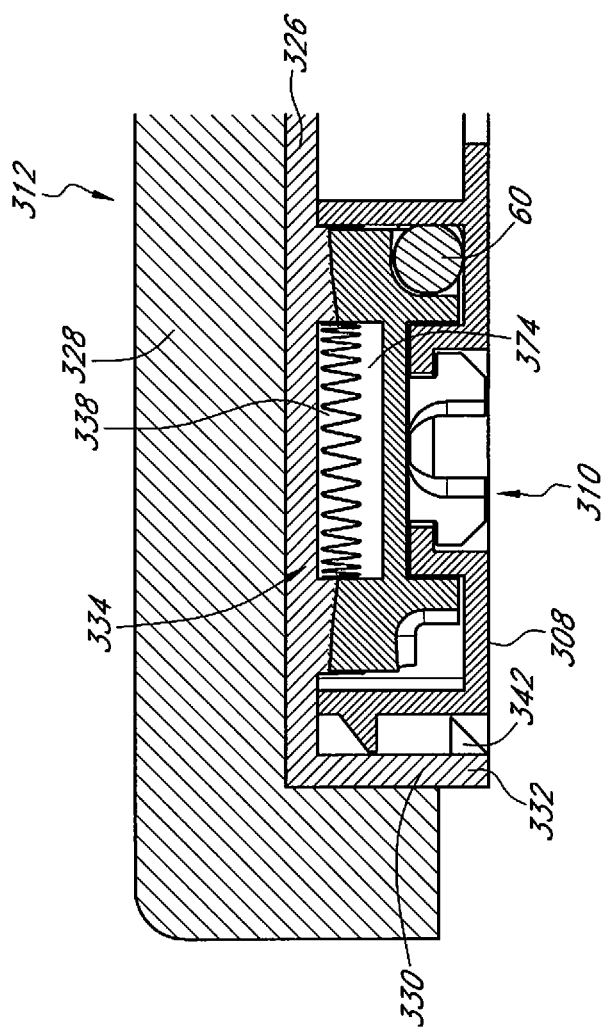
FIG. 34 is a combined cross sectional view of the mounting plate from FIG. 31 taken along line 32-32 and the cover of FIG. 33 taken along line 34-34, showing the cover assembled to the mounting plate in the 'Engaged' configuration.

The alternate cover's vertical retention feature 332, as shown in FIG. 34, is a snap lock feature 342 located on the side wall 330 of the alternate cover 312, and is spaced away from the alternate mounting plate 308 at a distance sufficient to allow the alternate cover 312 to travel vertically. The vertical travel should be sufficient to allow the alternate cover's 312 fore-aft retention feature 334 to decouple from the upper surface 340 of the ball gear 310, allowing it to freely rotate. A preferred material for the alternate cover 312 is a 10% Glass filled polypropylene, however any other suitable material may be chosen which allows for a one time deformation of the snap lock feature 342 during assembly.

Figure 35:
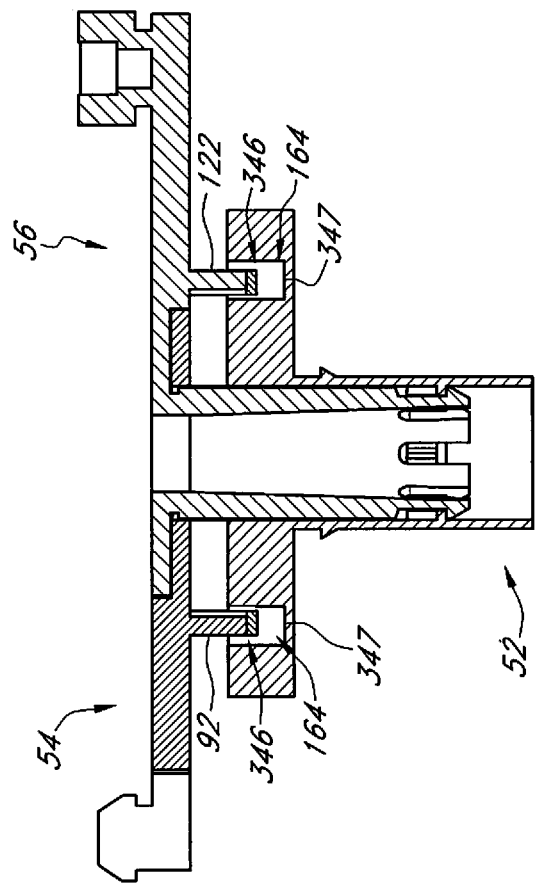
FIG. 35 is a cross sectional view of a third alternate embodiment of the invention taken along line 13-13 in FIG. 12 depicting an anti-rotation feature located in the recess of a range of motion limiter.

Additional embodiments of the lateral/rotational restraints are embodied by preventing the pin arm 56 and socket arms 54 from rotating within the mounting base 52. Alternate anti-rotation methodologies include, but are not limited to, placing friction inducing features 346 such as teeth or rubber pads at the base of the rotational stops (92, 122) on the pin arm 56 and socket arm 54 as shown in FIG. 35. These friction inducing features ideally engage the base 347 of the range of motion limiter 164, limiting rotation of the pin arm 56 and socket arm 54 within the mounting base 52. The friction inducing feature 346 may alternately be relocated into the mounting base's range of motion limiter 164 and engage the rotational stops (92, 122) on the pin arm 56 and socket arm 54. These friction inducing features 346 decouple when the mounting plate 58 is lifted vertically. Examples of friction inducing features 346 include the use of mating surfaces or coverings having a high coefficient of friction (such as rubber) or textured surfaces such as knurled, stippled, crenellated faces, or teeth.

Figure 36:
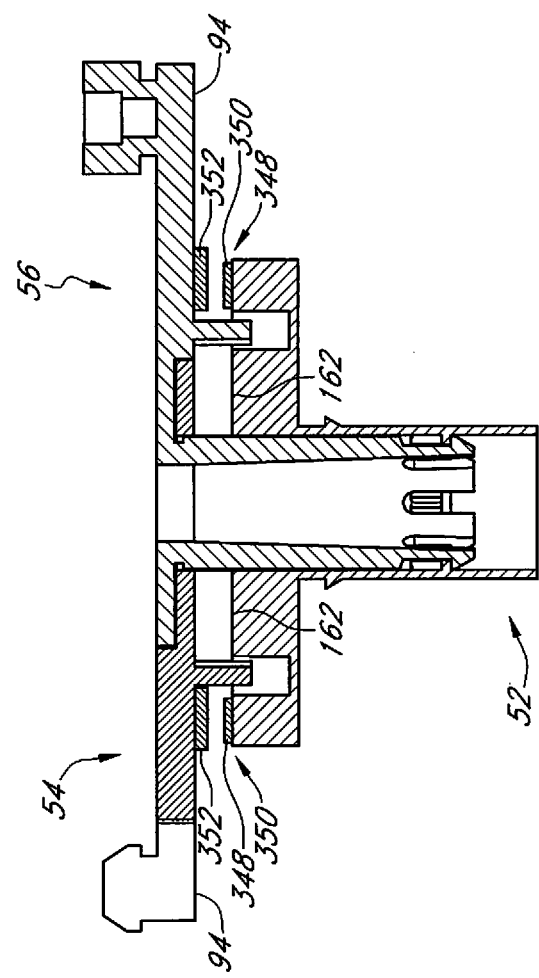
FIG. 36 is a cross sectional view of a fourth alternate embodiment of the invention taken along line 13-13 in FIG. 12 depicting an alternate anti-rotation feature located on the lower surface of the pin arm and socket arm.

Another embodiment of the lateral/rotational restraints is shown in FIG. 36 and includes an alternate friction inducing feature 348, such as teeth 350, located on the upper face 162 of the mounting base 52. These teeth 350 engage the underside 94 of pin arm 56 and socket arm 54, ideally engaging a mating set of teeth, or a rubber pad 352, thereby preventing rotational motion of the pin arm 56 or socket arm 54. The alternate friction inducing features 348 decouple when the mounting plate 58 is lifted vertically, lifting the attached pin arm 56 and socket arm 54.

Figure 37:
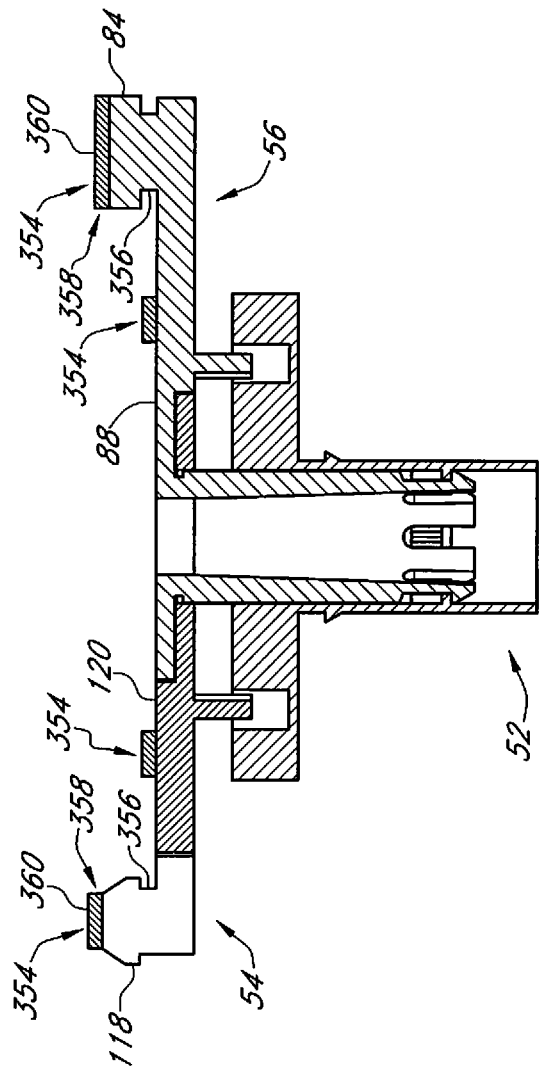
FIG. 37 is a cross sectional view of a fifth alternate embodiment of the invention taken along line 13-13 in FIG. 12 depicting an anti-rotation feature located on the upper surfaces of the pin arm and the socket arm, as well as an alternate fore-aft motion limiter installed onto the top portion of the slot engaging features.

A still further embodiment of the lateral/rotational restraints is shown in FIG. 37 and includes an upper surface friction inducing feature 354 mounted onto the top surface (88, 120) of the pin arm 56 and socket arm 54. This upper surface friction inducing feature 354 engages the substantially planar base section 198 of the mounting plate 58 when the mounting plate is depressed vertically. In order to have the upper surface friction inducing feature 354 decouple from the mounting plate 58 additional vertical travel must be allowed between the slot engaging features 84, 118 and the mounting plate 58. This additional vertical travel can be created by leaving additional spacing 356 between the top surfaces (88, 120) of the arms and the bottom of the slot engaging features (84, 118). These upper surface friction inducing features 354 decouple when the mounting plate 58 is lifted vertically.

Additional embodiments of the fore-aft restraint include a toothed element molded to a portion of the ball chain 60. When the cover 62 is depressed, the toothed element on the ball chain 60 engages a friction inducing surface on the upper cover 62. This friction inducing surface may be a rubber pad, or may be a section of mating teeth molded into the cover 62. A still further embodiment of a fore-aft restraint is shown in FIG. 37 and includes fore-aft friction inducing features 358 such as rubber pads or teeth 360 located on the top of the slot engaging features (84, 118) of the pin arm 56 and socket arm 54. The fore-aft friction inducing features 358 are preferably sized to engage the cover 62 when the cover is placed into the 'Engaged' configuration 228, thereby preventing further motion of the slot engaging features (84, 118) along the slot 200.

Additional features which are anticipated but not shown in the attached Figures include additional chain raceways, and additional ball gears. The chain raceways may also be relocated from the mounting plate 58 onto the cover 62. The cover 62 may also incorporate additional reinforcement ribs, or material reduction pockets similar to those used with the pin arm, or socket arm (54, 56). Additionally, the mounting base 52 may be modified to include two holes 142, each with their own anti-rotation feature 146 and pin arm 56. Further, the materials described herein may be substituted for any other suitable material, such as ferrous and non-ferrous metals, or alternate plastic compositions, and may further include plastic components with metal inserts. Particularly, it is anticipated that the plastic anti-rotation features and gears may be freely replaced with metal equivalents in order to increase the strength and longevity of these components. Additional forms of anti-rotation features known in the art may be substituted for those described herein so long as they properly decouple when the mounting plate or cover is lifted vertically.

The above description is considered that of the preferred embodiments only. Modifications to the invention will occur to those skilled in the art and those who make use of the invention. Therefore, it is understood that the embodiments shown in the drawings and the examples set forth herein are described merely for illustrative purposes, and are not intended to limit the scope of the invention as interpreted according to the principles of patent law, including the doctrine of equivalents.

The invention claimed is:

1. An adjustable arm rest for a chair, comprising:
a mounting plate including a base portion having a slot;
a first arm including a first slot engaging feature;
a second arm including a second slot engaging feature;
a mounting base;
wherein said first slot engaging feature and said second slot engaging feature engage with said slot and slide within said slot in said mounting plate;
wherein said first arm and said second arm are pivotally mounted to said mounting base thereby allowing said first arm and said second arm to rotate;
wherein said mounting plate is vertically positionable between an engaged configuration and a non-engaged configuration,
wherein when in the engaged configuration the rotation of said first and said second arms is restrained, and when in the non-engaged configuration, said first and second arms are allowed to rotate; and
wherein said engaged and said non-engaged configurations are controlled by the vertical position of said mounting plate relative to said mounting base.

2. The adjustable arm rest of claim 1 further comprising a fore-aft restraint system and a cover fitted to said mounting plate; said cover vertically positionable relative to said mounting plate, allowing said first slot engaging feature and said second slot engaging feature to traverse along said slot in said mounting plate when said cover is positioned away from said mounting plate, and restraining at least one of said first slot engaging feature or said second slot engaging feature from traversing along said slot in said mounting plate when said cover is positioned toward said mounting plate.

3. The adjustable arm rest of claim 2, wherein said fore-aft restraint system restrains said first slot engaging feature and said second slot engaging feature from traversing along said slot when said mounting plate is positioned into said engaged configuration, and allows said first slot engaging feature and said second slot engaging feature to traverse along said slot when said mounting plate is positioned into said non-engaged configuration.

4. The adjustable arm rest of claim 2 further comprising a second hole placed into said mounting base, wherein a portion of said second arm is inserted into said second hole.

5. The adjustable arm rest of claim 2 further comprising a first friction inducing feature placed on a lower surface of said first arm, and a second friction inducing feature placed on a lower surface of said second arm; wherein when said mounting plate is placed into said engaged configuration, said first friction inducing feature and said second friction inducing feature engage said mounting base, preventing rotation of said first and said second arms; and wherein when said mounting plate is placed into said non-engaged configuration, said first and second friction inducing features decouple from said mounting base allowing said first and said second arms to rotate.

6. The adjustable arm rest of claim 2 further comprising a third friction inducing feature placed on an upper surface of said first arm, and a fourth friction inducing feature placed on an upper surface of said second arm; wherein when said mounting plate is placed into said engaged configuration, said third friction inducing feature and said fourth friction inducing feature engage said mounting plate, preventing rotation of said first and said second arms; and wherein when said mounting plate is placed into said non-engaged configuration, said third and fourth friction inducing features decouple from said mounting plate allowing said first and said second arms to rotate.

7. The adjustable arm rest of claim 1 further comprising a first hole placed into said mounting base, wherein a portion of said first arm is inserted into said first hole.

8. The adjustable arm rest of claim 7 further comprising a first anti-rotation feature on a portion of said first arm, a second anti-rotation feature on a portion of said second arm, and a third anti-rotation feature on a portion of a side wall inside said hole in said mounting base.

9. The adjustable arm rest of claim 8 further comprising:
said first arm having a base portion and a socket placed through said base portion;
said second arm having a main shaft;
wherein said main shaft is inserted through said socket and into said first hole of said mounting base; and
wherein the axis of rotation of said first arm lies substantially concentric with the axis of rotation of said second arm.

10. The adjustable arm rest of claim 9 further comprising:
said first hole further having a counterbore;
a fourth anti-rotation feature on said counterbore;
wherein said second anti-rotation feature is located on a portion of said main shaft;
wherein when in the engaged configuration said first and said fourth anti-rotation features engage each other, restraining said first arm;
wherein when in the engaged configuration said second and said third anti-rotation features engage each other, restraining said second arm; and
wherein when in the non-engaged configuration, said first and second arms are free to rotate within said mounting base.

11. The adjustable arm rest of claim 10 further comprising a first rotational stop on said first arm, and a second rotational stop on said second arm, wherein said first rotational stop and said second rotational stop engage a range of motion limiter located on said mounting base.

12. An adjustable arm rest for a chair, comprising:
a mounting plate including a base portion having a slot;
a first arm including a first slot engaging feature, a socket arm body, a socket placed through said socket arm body, and a first anti-rotation feature on said socket arm body;
a second arm including a second slot engaging feature, a main shaft, and a second anti-rotation feature on said main shaft;
a mounting base having a first hole and a counterbore, the mounting base further comprising a third anti-rotation feature on a portion of a side wall inside said hole, and a fourth anti-rotation feature on a side wall of said counterbore;
wherein said first arm and said second arm are pivotally mounted to said mounting base by inserting said main shaft into said socket and placing said main shaft into said first hole in said mounting base causing the axis of rotation of said first arm to lie substantially concentric with the axis of rotation of said second arm;
wherein said first slot engaging feature and said second slot engaging feature engage with said slot and slide within said slot in said mounting plate;
wherein said mounting plate is positionable between an engaged and a non-engaged configuration controlled by the vertical position of said mounting plate relative to said mounting base;
wherein when placed into the engaged configuration, said first and said fourth anti-rotation features engage each other restraining said first arm, and said second and said third anti-rotation features engage each other restraining said second arm; and
wherein when placed into the non-engaged configuration, said first and said fourth anti-rotation features disengage from each other allowing said first arm to rotate within said mounting base, and said second and said third anti-rotation features disengage from each other allowing said second arm to rotate within said mounting base.

13. The adjustable arm rest of claim 12 further comprising a second slot in said mounting plate, wherein said second slot engaging feature of said second arm engages with said second slot and slides within said second slot.

14. The adjustable arm rest of claim 12 further comprising a first rotational stop located on said first arm, a second rotational stop located on said second arm, and a range of motion limiter located on said mounting base, wherein said first and said second rotational stops are fitted into said range of motion limiter thereby limiting the maximum rotation of said adjustable arm rest.

15. The adjustable arm rest of claim 12 further comprising:
a fore-aft restraint system; and
a cover fitted to said mounting plate, said cover vertically positionable relative to said mounting plate:
wherein when said cover is positioned away from said mounting plate, said first slot engaging feature and said second slot engaging feature are able to traverse along said slot in said mounting plate; and
wherein when said cover is positioned toward said mounting plate, said first slot engaging feature or said second slot engaging feature is restrained from being able to traverse along said slot in said mounting plate.

16. The adjustable arm rest of claim 15 further comprising:
a ball chain raceway, a ball chain, and a chain tensioner located on said mounting plate;
a ball chain engaging feature located on said cover; and
a ball chain retention feature anchoring said ball chain to at least one of said first arm or said second arm;
wherein when said cover is positioned toward said mounting plate, said ball chain engaging feature engages said ball chain preventing said ball chain from traversing along said ball chain raceway, which in turn stops motion of said first or said second arm along said slot in said mounting plate; and wherein when said cover is positioned away from said mounting plate, said ball chain freely traverses along said ball chain raceway allowing said first or second slot engaging feature to freely traverse along said slot.

17. The adjustable arm rest of claim 15 further comprising:
a ball chain raceway, a ball chain, and a ball gear located on said base portion of said mounting plate;
a ball gear engaging feature on said cover; and
a ball chain retention feature anchoring said ball chain to at least one of said first arm or said second arm;
wherein when said cover is positioned toward said mounting plate, said ball gear engaging feature engages said ball gear, thereby preventing said ball gear from rotating, in turn preventing said ball chain from traversing along said ball chain raceway, thereby stopping motion of said first or said second arm along said slot in said mounting plate; and
wherein when said cover is positioned away from said mounting plate, said ball gear freely rotates, thereby allowing said ball chain to move freely along said ball chain raceway, thereby allowing said first or second arm to freely traverse along said slot.

18. The adjustable arm rest of claim 15 further comprising a friction inducing feature located on a top surface of said first slot engaging feature or a top surface of said second slot engaging feature, wherein when said cover is positioned away from said mounting plate, said friction inducing feature disengages from the lower surface of said cover plate allowing said first or second slot engaging features to freely traverse along said slot, and wherein when said cover is positioned toward said mounting plate, said friction inducing feature engages the lower surface of said cover preventing said first arm or said second arm from traversing along said slot.

19. An adjustable arm rest for a chair, comprising:
a mounting plate including a base portion having a slot;
a first arm including a first slot engaging feature, a socket arm body, a socket placed through said socket arm body, and a first anti-rotation feature on said socket arm body;
a second arm including a second slot engaging feature, a main shaft, and a second anti-rotation feature on a portion of said main shaft;
a mounting base having a first hole and a counterbore, the mounting base further comprising a third anti-rotation feature on a portion of a side wall inside said hole, and a fourth anti-rotation feature on a side wall of said counterbore ;
a cover fitted to said mounting plate and sized to allow said cover to be positioned vertically relative to said mounting plate; and
a fore-aft restraint system comprising;
a ball chain raceway, a ball chain, and a chain tensioner located on said mounting plate; a ball chain engaging feature on said cover; and
a ball chain retention feature anchoring said ball chain to at least one of said first or said second slot engagement features of said first arm or said second arm;
wherein said first arm and said second arm are pivotally mounted to said mounting base by inserting said main shaft into said said socket and placing said main shaft into said first hole causing the axis of rotation of said first arm to lie substantially concentric with the axis of rotation of said second arm;
wherein said first slot engaging feature and said second slot engaging feature engage with said slot and slide within said slot in said mounting plate;
wherein when said cover is positioned toward said mounting base: said first and said fourth anti-rotation features engage each other, thereby preventing said first arm from rotating within said mounting base; said second and said third anti-rotation features engage each other, thereby preventing said second arm from rotating within said mounting base; and said ball chain engaging feature engages said ball chain, thereby preventing said ball chain from traversing along said ball chain raceway, thereby preventing said first or said second arm anchored to said ball chain from traversing along said slot in said mounting plate thereby constraining motion of said cover relative to said mounting base in at least three degrees of freedom; and
wherein when said cover is positioned away from said mounting base: said first and said fourth anti-rotation features disengage from each other, thereby allowing said first arm to rotate within said mounting base; and said second and said third anti-rotation features disengage from each other, thereby allowing said second arm to rotate within said mounting base; and allowing said ball chain to freely traverse along said ball chain raceway, thereby allowing said first or second slot engaging feature to freely traverse along said slot, thereby allowing motion of said cover relative to said mounting base in at least three degrees of freedom.

20. The adjustable arm rest of claim 19 further comprising a first rotational stop located on said first arm, a second rotational stop located on said second arm, and a range of motion limiter located on said mounting base, wherein said first and said second rotational stops are fitted into said range of motion limiter, thereby limiting the maximum rotation of said adjustable arm rest.

* * * * *